United States Patent
Xi et al.

(10) Patent No.: US 12,361,517 B2
(45) Date of Patent: Jul. 15, 2025

(54) VIEW-DEPENDENT MULTIPLE STREAMING FOR EXTENDED REALITY (XR) RENDERING OFFLOADING

(71) Applicant: QUALCOMM Incorporated, San Diego, CA (US)

(72) Inventors: Fengjun Xi, San Diego, CA (US); Bongyong Song, San Diego, CA (US); Qing Li, Princeton Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 18/047,941

(22) Filed: Oct. 19, 2022

(65) Prior Publication Data

US 2024/0135493 A1 Apr. 25, 2024
US 2024/0233079 A9 Jul. 11, 2024

(51) Int. Cl.
*G06T 3/4092* (2024.01)
*H04L 67/131* (2022.01)

(52) U.S. Cl.
CPC ........ *G06T 3/4092* (2013.01); *G06T 2200/16* (2013.01); *H04L 67/131* (2022.05)

(58) Field of Classification Search
CPC .. G06T 3/4092; G06T 2200/16; H04L 67/131
See application file for complete search history.

(56) References Cited

U.S. PATENT DOCUMENTS

| | | | |
|---|---|---|---|
| 9,842,377 B2 * | 12/2017 | Kopf | G06T 5/70 |
| 2013/0038618 A1 * | 2/2013 | Urbach | G06F 9/5005 |
| | | | 345/522 |
| 2017/0200254 A1 * | 7/2017 | Kopf | H04N 21/44012 |
| 2017/0243324 A1 * | 8/2017 | Mierle | G06T 15/005 |
| 2018/0183855 A1 * | 6/2018 | Sabella | G06F 9/5072 |
| 2018/0261012 A1 * | 9/2018 | Mullins | H04L 67/535 |
| 2019/0287495 A1 * | 9/2019 | Mathur | G02B 27/0172 |
| 2019/0384136 A1 * | 12/2019 | Grover | G09G 5/377 |
| 2020/0334833 A1 * | 10/2020 | Gibbon | H04N 21/23418 |

(Continued)

OTHER PUBLICATIONS

Z. Zheng, E. Prakash and T. Chan, "Interactive View-Dependent Rendering over Networks," in IEEE Transactions on Visualization and Computer Graphics, vol. 14, No. 3, pp. 576-589, May-Jun. 2008, doi: 10.1109/TVCG.2007.70626. (Year: 2007).*

(Continued)

*Primary Examiner* — Yu Chen
(74) *Attorney, Agent, or Firm* — Harrity & Harrity, LLP

(57) ABSTRACT

Various aspects of the present disclosure generally relate to wireless communication. In some aspects, an extended reality (XR) device may transmit, to a first wireless communication device and a second wireless communication device, a first portion of rendering data and a second portion of rendering data, respectively, for offloaded rendering, wherein a division of the rendering data into the first portion of the rendering data and the second portion of the rendering data is based at least in part on view information. The XR device may receive, from the first wireless communication device and the second wireless communication device, a first portion of rendered data and a second portion of the rendered data, respectively, based at least in part on the transmitting. Numerous other aspects are described.

30 Claims, 12 Drawing Sheets

(56) References Cited

U.S. PATENT DOCUMENTS

| | | | |
|---|---|---|---|
| 2022/0172440 A1* | 6/2022 | Budagavi | H04N 21/6332 |
| 2022/0256647 A1 | 8/2022 | Salmasi et al. | |
| 2022/0292756 A1* | 9/2022 | Desai | G06F 9/5044 |
| 2024/0106757 A1* | 3/2024 | Lee | H04W 28/0289 |

OTHER PUBLICATIONS

J. K. Sundararajan et al., "Performance Evaluation of Extended Reality Applications in 5G NR System," 2021 IEEE 32nd Annual International Symposium on Personal, Indoor and Mobile Radio Communications (PIMRC), Helsinki, Finland, 2021, pp. 1-7, doi: 10.1109/PIMRC50174.2021.9569585. (Year: 2021).*

Y. Liu, J. Liu, A. Argyriou and S. Ci, "MEC-Assisted Panoramic VR Video Streaming Over Millimeter Wave Mobile Networks," in IEEE Transactions on Multimedia, vol. 21, No. 5, pp. 1302-1316, May 2019, doi: 10.1109/TMM.2018.2876044. (Year: 2019).*

L. Brehon-Grataloup, R. Kacimi and A.-L. Beylot, "Context-aware task offloading with QoS-provisioning for MEC multi-RAT vehicular networks," 2022 International Conference on Computer Communications and Networks (ICCCN), Honolulu, HI, USA, 2022, pp. 1-9, doi: 10.1109/ICCCN54977.2022.9868873. (Year: 2022).*

International Search Report and Written Opinion—PCT/US2023/074684—ISA/EPO—Jan. 4, 2024.

* cited by examiner

VIEW-DEPENDENT MULTIPLE STREAMING FOR EXTENDED REALITY (XR) RENDERING OFFLOADING

FIELD OF THE DISCLOSURE

Aspects of the present disclosure generally relate to wireless communication and to techniques and apparatuses for view-dependent multiple streaming for XR rendering offloading.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of an extended reality (XR) device. The method may include transmitting, to a first wireless communication device and a second wireless communication device, a first portion of rendering data and a second portion of rendering data, respectively, for offloaded rendering, where a division of the rendering data into the first portion of the rendering data and the second portion of the rendering data is based at least in part on view information. The method may include receiving, from the first wireless communication device and the second wireless communication device, a first portion of rendered data and a second portion of the rendered data, respectively, based at least in part on the transmitting.

Some aspects described herein relate to a method of wireless communication performed by a wireless communication device. The method may include receiving a first portion of rendering data for offloaded rendering, where a second portion of rendering data is directed to another wireless communication device, where a division of the rendering data into the first portion of the rendering data and the second portion of the rendering data is based at least in part on view information. The method may include transmitting a first portion of rendered data based at least in part on the first portion of the rendering data, wherein a second portion of the rendered data is based at least in part on the second portion of the rendering data.

Some aspects described herein relate to an XR device for wireless communication. The XR device may include a memory and one or more processors coupled to the memory. The one or more processors may be configured to transmit, to a first wireless communication device and a second wireless communication device, a first portion of rendering data and a second portion of rendering data, respectively, for offloaded rendering. The one or more processors may be configured to receive, from the first wireless communication device and the second wireless communication device, a first portion of rendered data and a second portion of the rendered data, respectively, based at least in part on the transmitting.

Some aspects described herein relate to a wireless communication device for wireless communication. The wireless communication device may include a memory and one or more processors coupled to the memory. The one or more processors may be configured to receive a first portion of rendering data for offloaded rendering. The one or more processors may be configured to transmit a first portion of rendered data based at least in part on the first portion of the rendering data, wherein a second portion of the rendered data is based at least in part on a second portion of the rendering data.

Some aspects described herein relate to a non-transitory computer-readable medium that stores a set of instructions for wireless communication. The set of instructions, when executed by one or more processors of an XR device, may cause the XR device to transmit, to a first wireless communication device and a second wireless communication device, a first portion of rendering data and a second portion of rendering data, respectively, for offloaded rendering. The set of instructions, when executed by one or more processors of the XR device, may cause the XR device to receive, from the first wireless communication device and the second wireless communication device, a first portion of rendered data and a second portion of the rendered data, respectively, based at least in part on the transmitting.

Some aspects described herein relate to a non-transitory computer-readable medium that stores a set of instructions for wireless communication by a wireless communication device. The set of instructions, when executed by one or more processors of the wireless communication device, may cause the wireless communication device to receive a first portion of rendering data for offloaded rendering. The set of instructions, when executed by one or more processors of the wireless communication device, may cause the wireless communication device to transmit a first portion of rendered data based at least in part on the first portion of the rendering data, wherein a second portion of the rendered data is based at least in part on a second portion of the rendering data.

Some aspects described herein relate to an apparatus for wireless communication. The apparatus may include means for transmitting, to a first wireless communication device and a second wireless communication device, a first portion of rendering data and a second portion of rendering data, respectively, for offloaded rendering, where a division of the rendering data into the first portion of the rendering data and the second portion of the rendering data is based at least in part on view information. The apparatus may include means for receiving, from the first wireless communication device and the second wireless communication device, a first portion of rendered data and a second portion of the rendered data, respectively, based at least in part on the transmitting.

Some aspects described herein relate to an apparatus for wireless communication. The apparatus may include means for receiving a first portion of rendering data for offloaded rendering, where a second portion of rendering data is directed to another apparatus, where a division of the rendering data into the first portion of the rendering data and the second portion of the rendering data is based at least in part on view information. The apparatus may include means for transmitting a first portion of rendered data based at least in part on the first portion of the rendering data, wherein a second portion of the rendered data is based at least in part on the second portion of the rendering data.

Aspects generally include a method, apparatus, system, computer program product, non-transitory computer-readable medium, user equipment, base station, network entity, network node, XR device, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G). In some examples, "LTE Sidelink (SL)" may be used interchangeably with "V2X SL," "5G" may be used interchangeably used with "NR," and "viewport" or "viewpoint" may be used interchangeably with "view."

Figure 1:
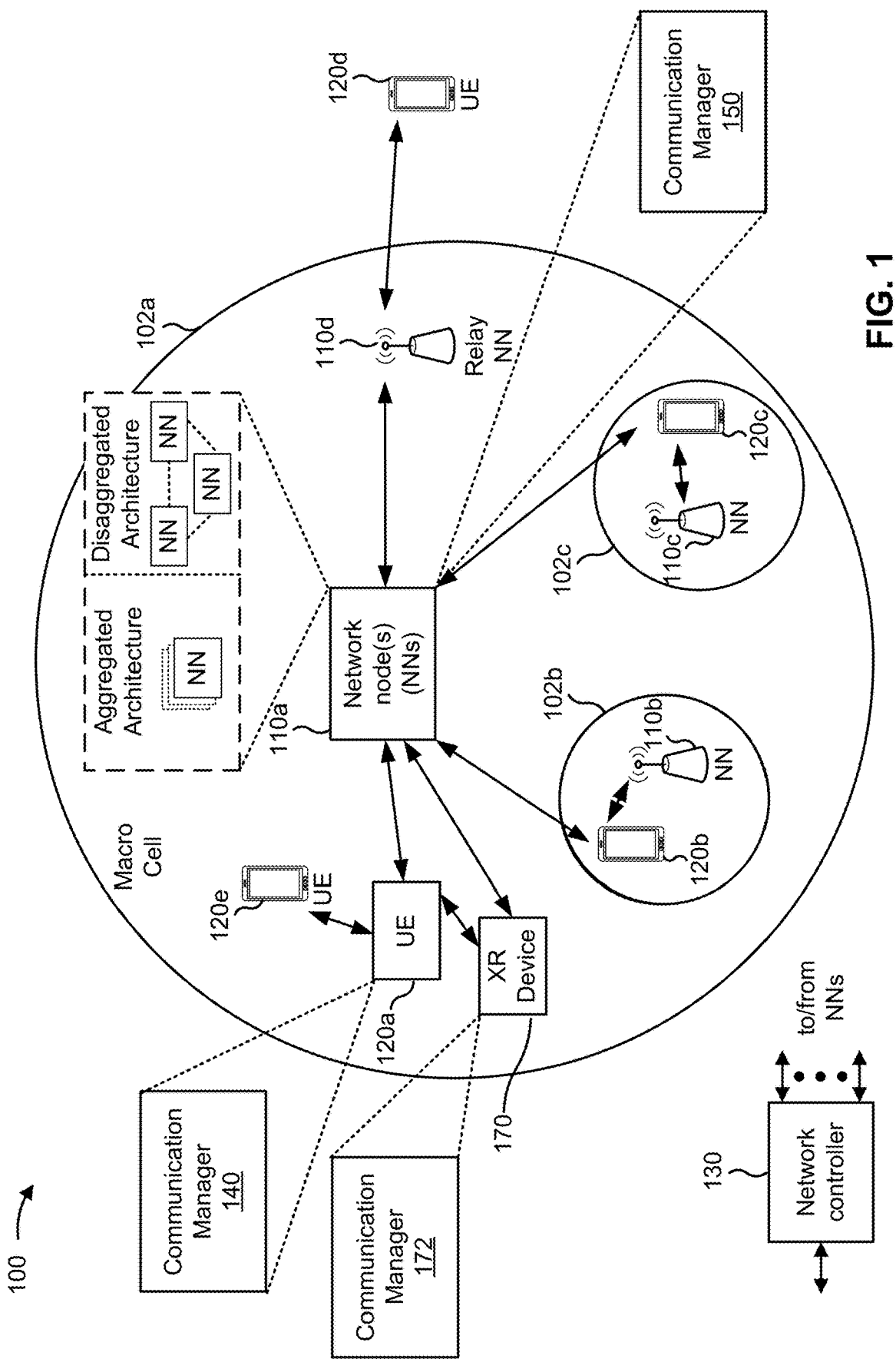
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In some examples, the wireless network 100 may include an extended reality (XR) device 170. For example, an XR device 170 may communicate with a network node 110 (e.g., via an access link) and/or a UE 120 (e.g., via a sidelink). In some examples, an XR device 170 may be an example of a UE 120. In other words, some UEs 120 may be XR devices 170. XR functionalities may include augmented reality (AR), virtual reality (VR), or mixed reality (MR), among other examples. For example, when providing an XR service, the XR device 170 may provide rendered data via a display, such as a screen, a set of VR goggles, a heads-up display, or another type of display.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the XR device 170 may include a communication manager 172. As described in more detail elsewhere herein, the communication manager 172 may transmit, to a first wireless communication device and a second wireless communication device, a first portion of rendering data and a second portion of rendering data, respectively, for offloaded rendering, wherein a division of the rendering data into the first portion of the rendering data and the second portion of the rendering data is based at least in part on view information; and receive, from the first wireless communication device and the second wireless communication device, a first portion of rendered data and a second portion of the rendered data, respectively, based at least in part on the transmitting. Additionally, or alternatively, the communication manager 172 may perform one or more other operations described herein.

In some aspects, a wireless communication device (e.g., a UE 120 or a network node 110) may include a communication manager 140 or 150. As described in more detail elsewhere herein, the communication manager 140 or 150 may receive a first portion of rendering data for offloaded rendering, wherein a second portion of rendering data is directed to another wireless communication device, wherein a division of the rendering data into the first portion of the rendering data and the second portion of the rendering data is based at least in part on view information; and transmit a first portion of rendered data based at least in part on the first portion of the rendering data, wherein a second portion of the rendered data is based at least in part on the second portion of the rendering data. Additionally, or alternatively, the communication manager 140 or 150 may perform one or more other operations described herein.

As indicated above, FIG. 1 is provided as an example. Other examples may differ from what is described with regard to FIG. 1.

Figure 2:
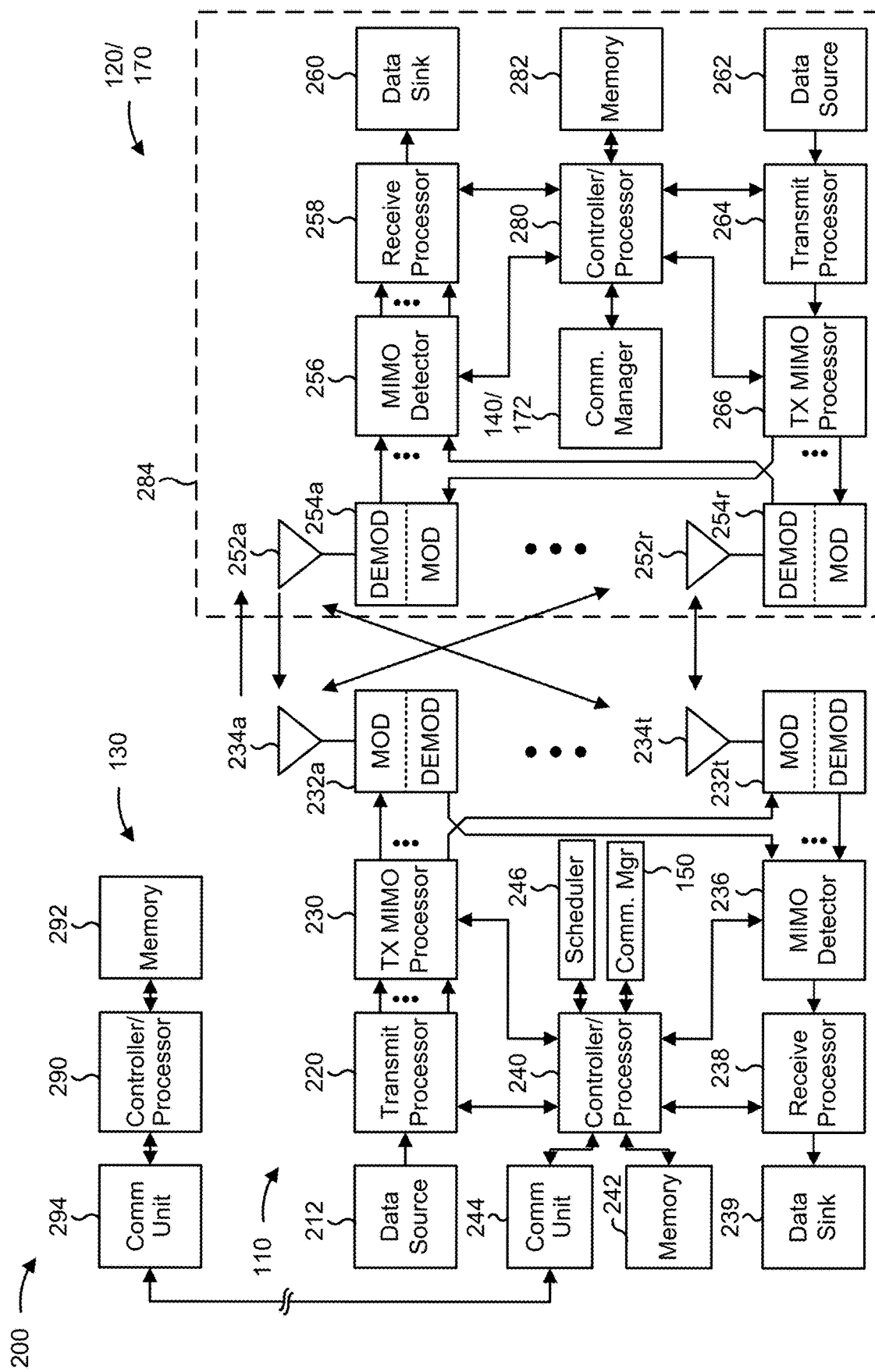
FIG. 2 is a diagram illustrating an example of a network node in communication with a user equipment or an extended reality (XR) device in a wireless network, in accordance with the present disclosure.

FIG. 2 is a diagram illustrating an example 200 of a network node 110 in communication with a UE 120 or the XR device 170 in a wireless network 100, in accordance with the present disclosure. The network node 110 may be equipped with a set of antennas 234a through 234t, such as T antennas (T≥1). The UE 120 or the XR device 170 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120, the XR device 170, or another network node. Some network nodes 110 may not include radio frequency components that facilitate direct communication with the UE 120 or the XR device 170, such as one or more CUs, or one or more DUs.

At the network node 110, a transmit processor 220 may receive data, from a data source 212, intended for the UE 120 or the XR device 170 (or a set of UEs 120 or a set of XR devices 170). The transmit processor 220 may select one or more modulation and coding schemes (MCSs) for the UE 120 or the XR device 170 based at least in part on one or more channel quality indicators (CQIs) received from the UE 120 or the XR device 170. The network node 110 may process (e.g., encode and modulate) the data for the UE 120 or the XR device 170 based at least in part on the MC S(s) selected for the UE 120 or the XR device 170 and may provide data symbols for the UE 120 or the XR device 170. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120 or the XR device 170, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 or the XR device 170 to a data sink 260, and may provide decoded control information and system information to a controller/processor 280. The term "controller/processor" may refer to one or more controllers, one or more processors, or a combination thereof. A channel processor may identify a reference signal received power (RSRP) parameter, a received signal strength indicator (RSSI) parameter, a reference signal received quality (RSRQ) parameter, and/or a CQI parameter, among other examples. In some examples, one or more components of the UE 120 or the XR device 170 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120 or the XR device 170, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 or the XR device 170 may include a modulator and a demodulator. In some examples, the UE 120 or the XR device 170 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the network node 110, the uplink signals from UE 120 or the XR device 170 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120 or the XR device 170. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 or the XR device 170 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6A-10).

The controller/processor 240 of the network node 110, the controller/processor 280 of the UE 120 or the XR device 170, and/or any other component(s) of FIG. 2 may perform one or more techniques associated with view-dependent multiple streaming for XR rendering offloading, as described in more detail elsewhere herein. For example, the controller/processor 240 of the network node 110, the controller/processor 280 of the UE 120 or the XR device 170, and/or any other component(s) of FIG. 2 may perform or direct operations of, for example, process 700 of FIG. 7, process 800 of FIG. 8, and/or other processes as described herein. The memory 242 and the memory 282 may store data and program codes for, respectively, the network node 110 and the UE 120 or the XR device 170. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110, the UE 120, and/or the XR device 170, may cause the one or more processors, the UE 120, the XR device 170, and/or the network node 110 to perform or direct operations of, for example, process 7—of FIG. 7, process 800 of FIG. 8, and/or other processes as described herein. In some examples, executing instructions may include running the instructions, converting the instructions, compiling the instructions, and/or interpreting the instructions, among other examples.

In some aspects, the XR device 170 includes means for transmitting, to a first wireless communication device and a second wireless communication device, a first portion of rendering data and a second portion of rendering data, respectively, for offloaded rendering, wherein a division of the rendering data into the first portion of the rendering data and the second portion of the rendering data is based at least in part on view information; and/or means for receiving, from the first wireless communication device and the second wireless communication device, a first portion of rendered data and a second portion of the rendered data, respectively, based at least in part on the transmitting. In some aspects, the means for the XR device 170 to perform operations described herein may include, for example, one or more of communication manager 172, antenna 252, modem 254, MIMO detector 256, receive processor 258, transmit processor 264, TX MIMO processor 266, controller/processor 280, or memory 282.

In some aspects, a wireless communication device (e.g., a UE 120 or a network node 110) includes means for receiving a first portion of rendering data for offloaded rendering, wherein a second portion of rendering data is directed to another wireless communication device, wherein a division of the rendering data into the first portion of the rendering data and the second portion of the rendering data is based at least in part on view information; and/or means for transmitting a first portion of rendered data based at least in part on the first portion of the rendering data, wherein a second portion of the rendered data is based at least in part on the second portion of the rendering data. In some aspects, the means for the wireless communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
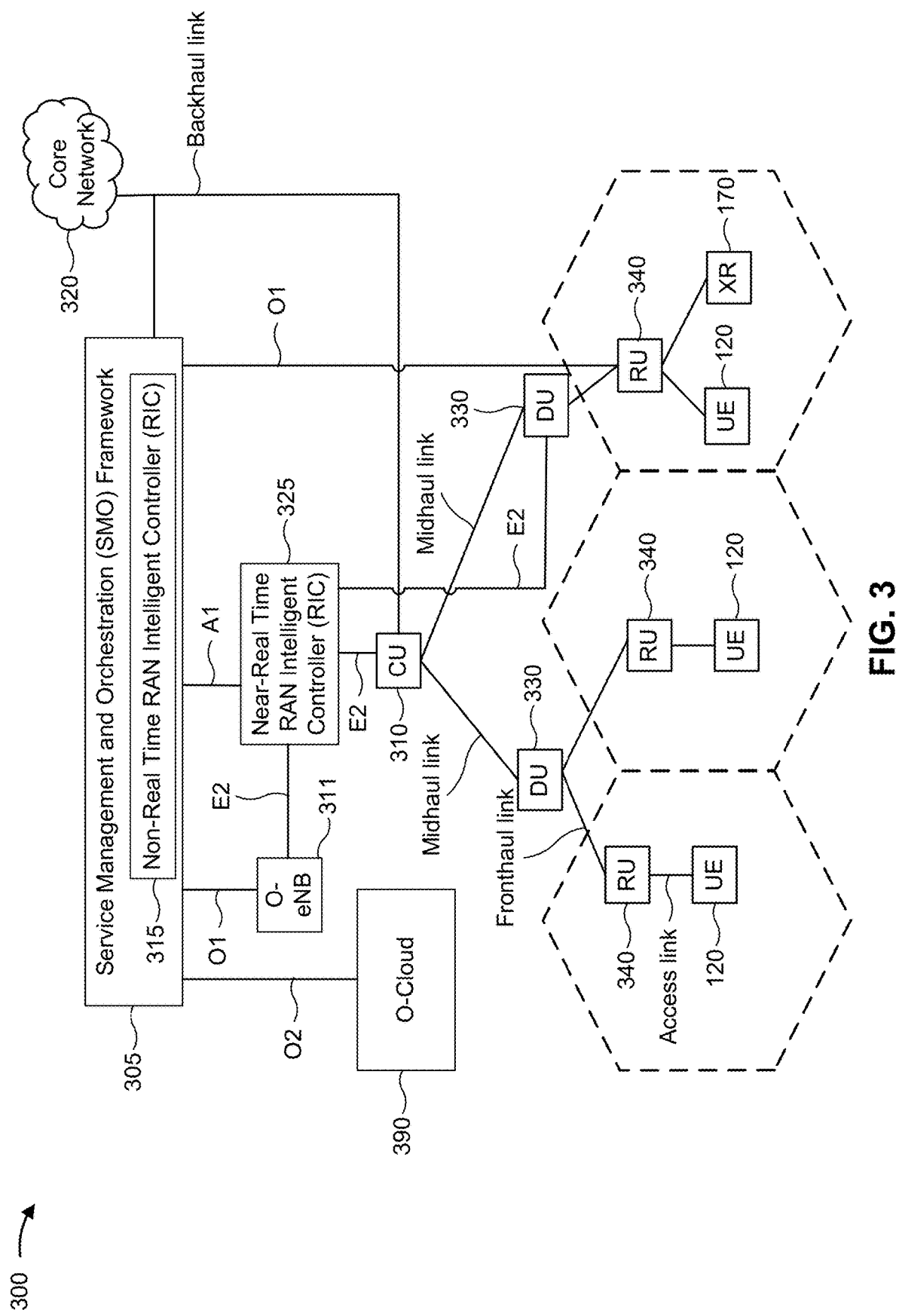
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 or XR devices 170 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120 or XR devices 170. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
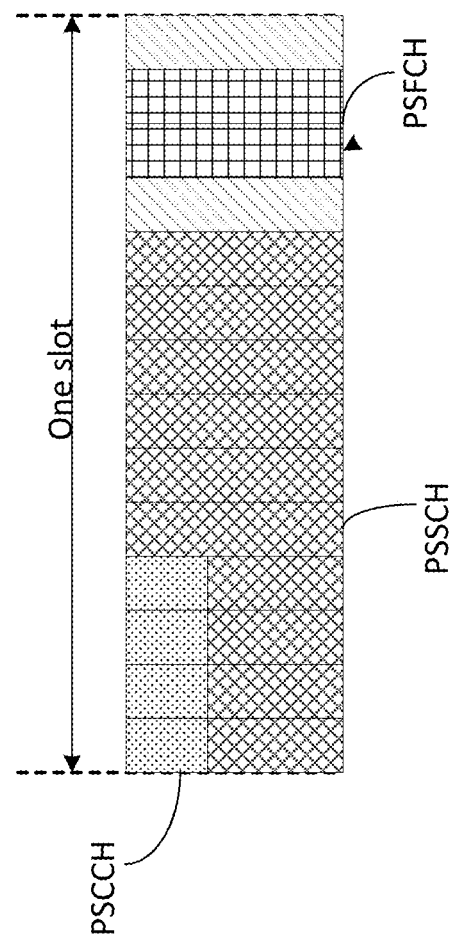
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE may communicate with a second UE (or more other UEs) via one or more sidelink channels. Although some aspects are described in terms of communications between a pair of UEs, aspects described herein also may apply to communications between a pair of XR devices or between a UE and an XR device. The UEs may communicate using the one or more sidelink channels for P2P communications, D2D communications, XR communications, V2X communications (e.g., which may include V2V communications, V2I communications, vehicle to network (V2N) communications, and/or V2P communications) and/or mesh networking. In some aspects, the UEs may correspond to one or more other UEs described elsewhere herein, such as UE 120. In some aspects, the one or more sidelink channels may use a PC5 interface and/or may operate in a high frequency band (e.g., the 5.9 GHz band). Additionally, or alternatively, the UEs may synchronize timing of transmission time intervals (TTIs) (e.g., frames, subframes, slots, or symbols) using global navigation satellite system (GNSS) timing.

As further shown in FIG. 4, the one or more sidelink channels may include a physical sidelink control channel (PSCCH), a physical sidelink shared channel (PSSCH), and/or a physical sidelink feedback channel (PSFCH). The PSCCH may be used to communicate control information, similar to a physical downlink control channel (PDCCH) and/or a physical uplink control channel (PUCCH) used for cellular communications with a network node 110 via an access link or an access channel. The PSSCH may be used to communicate data, similar to a physical downlink shared channel (PDSCH) and/or a physical uplink shared channel (PUSCH) used for cellular communications with a network node 110 via an access link or an access channel. For example, the PSCCH may carry sidelink control information (SCI), which may indicate various control information used for sidelink communications, such as one or more resources (e.g., time resources, frequency resources, and/or spatial resources) where a transport block (TB) may be carried on the PSSCH. The TB may include data. The PSFCH may be used to communicate sidelink feedback, such as hybrid automatic repeat request (HARQ) feedback (e.g., acknowledgement or negative acknowledgement (ACK/NACK) information), transmit power control (TPC), and/or a scheduling request (SR).

Although shown on the PSCCH, in some aspects, the SCI may include multiple communications in different stages, such as a first stage SCI (SCI-1) and a second stage SCI (SCI-2). The SCI-1 may be transmitted on the PSCCH. The SCI-2 may be transmitted on the PSSCH. The SCI-1 may include, for example, an indication of one or more resources (e.g., time resources, frequency resources, and/or spatial resources) on the PSSCH, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH, such as a hybrid automatic repeat request (HARQ) process ID, a new data indicator (NDI), a source identifier, a destination identifier, and/or a channel state information (CSI) report trigger.

In some aspects, the one or more sidelink channels may use resource pools. For example, a scheduling assignment (e.g., included in SCI) may be transmitted in sub-channels using specific resource blocks (RBs) across time. In some aspects, data transmissions (e.g., on the PSSCH) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE may operate using a sidelink transmission mode (e.g., Mode 1) where resource selection and/or scheduling is performed by a network node 110 (e.g., a base station, a CU, or a DU). For example, the UE may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE may operate using a transmission mode (e.g., Mode 2) where resource selection and/or scheduling is performed by the UE (e.g., rather than a network node 110). In some aspects, the UE may perform resource selection and/or scheduling by sensing channel availability for transmissions. For example, the UE may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE may perform resource selection and/or scheduling using SCI received in the PSCCH, which may indicate occupied resources and/or channel parameters. Additionally, or alternatively, the UE may perform resource selection and/or scheduling by identifying a channel busy ratio (CBR) associated with various sidelink channels, which may be used for rate control (e.g., by indicating a maximum number of resource blocks that the UE can use for a particular set of subframes).

In the transmission mode where resource selection and/or scheduling is performed by a UE, the UE may generate sidelink grants, and may transmit the grants in SCI. A sidelink grant may indicate, for example, one or more parameters (e.g., transmission parameters) to be used for an upcoming sidelink transmission, such as one or more resource blocks to be used for the upcoming sidelink transmission on the PSSCH (e.g., for TBs), one or more subframes to be used for the upcoming sidelink transmission, and/or a modulation and coding scheme (MCS) to be used for the upcoming sidelink transmission. In some aspects, a UE may generate a sidelink grant that indicates one or more parameters for semi-persistent scheduling (SPS), such as a periodicity of a sidelink transmission. Additionally, or alternatively, the UE may generate a sidelink grant for event-driven scheduling, such as for an on-demand sidelink message.

As indicated above, FIG. 4 is provided as an example. Other examples may differ from what is described with respect to FIG. 4.

Figure 5:
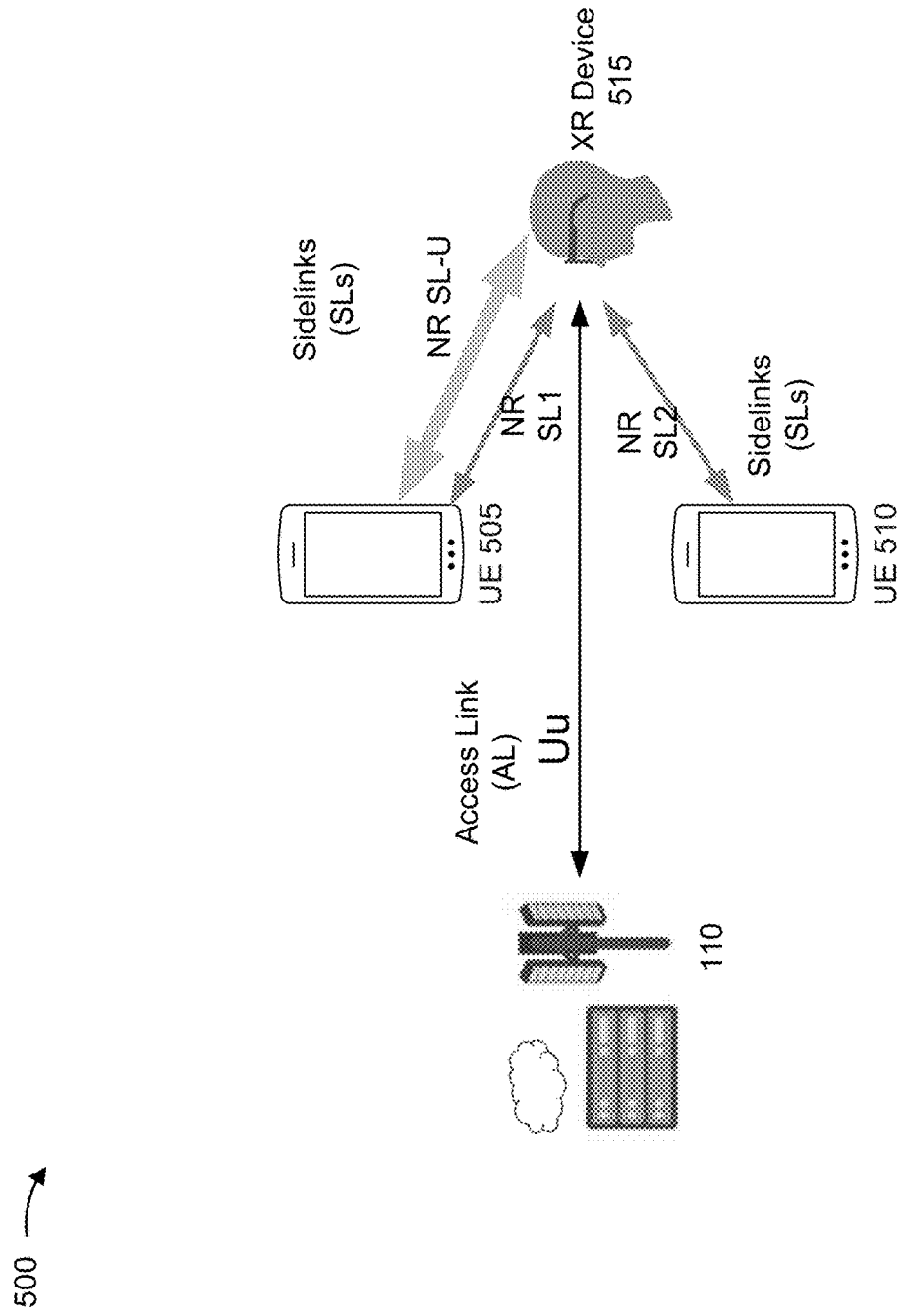
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a UE 505, a UE 510, and an XR device 515 may communicate with one another via a sidelink, as described above in connection with FIG. 4. As further shown, in some sidelink modes (e.g., NR sidelink mode 1 or LTE V2X sidelink mode 3), a network node 110 may communicate with the UE 505 (e.g., directly or via one or more network nodes), such as via a first access link. Additionally, or alternatively, in some sidelink modes, the network node 110 may communicate with the UE 510 (e.g., directly or via one or more network nodes), such as via a first access link. Additionally, or alternatively, in some sidelink modes (e.g., NR sidelink mode 1, LTE V2X sidelink mode 3, or a similar network-controlled sidelink mode), the network node 110 may communicate with the XR device 515 (e.g., directly or via one or more network nodes), such as via a first access link. Additionally, or alternatively, in some sidelink modes (e.g., NR sidelink mode 2, LTE V2X sidelink mode 4, or a similar autonomous sidelink mode), the UE 505 and/or the UE 510 may communicate with the XR device 515 via a first and/or a second sidelink (SL). The UE 505 and/or the UE 510 may correspond to one or more UEs described elsewhere herein, such as the UE 120 of FIG. 1. The XR device 515 may correspond to one or more XR devices described herein, such as the XR device 170 of FIG. 1. Thus, a direct link between UEs 120 or between a UE 120 and an XR device 170 (e.g., over a PC5 interface, via NR sidelink (NR SL) interface, such as NR SL1 or NR SL2, or an NR sidelink unlicensed spectrum (NR SL-U) interface or LTE sidelink (LTE SL)) may be referred to as a sidelink, and a direct link between a network node 110 and a UE 505/510 or XR device 515 (e.g., over a Uu interface) may be referred to as an access link. Sidelink communications may be transmitted via the sidelink, and access link communications may be transmitted via the access link. An access link communication may be either a downlink communication (from a network node 110 to a UE 120 or an XR device 170)

or an uplink communication (from a UE 120 or an XR device 170 to a network node 110).

As indicated above, FIG. 5 is provided as an example. Other examples may differ from what is described with respect to FIG. 5.

As described above, an XR device may provide rendered data (e.g., video data or XR data) via a display of the XR device. For example, the XR device may provide VR video data that has been rendered for a user based on a location of the user, an orientation of the user and/or the XR device, or a state of an application generating the VR video data, among other examples. Rendering data in real-time for XR services may cause an XR device to use relatively large amounts of processing resources and/or power resources. Additional details regarding rendering of XR data are described with regard to 3GPP TR 26.928. However, some XR devices may have limited processing resources and/or power resources, which may limit an amount of data that some XR devices can render in real-time. This may result in an XR device down-selecting to a lower quality of video or may cause gaps or artifacts in video provided by the XR device, among other issues.

Split rendering can be used to offload some rendering tasks from an XR device with limited resources. For example, an XR device can offload a rendering task to an edge device or cloud device with a greater availability of computing resources and/or power resources relative to the XR device. In some cases, the XR device may split a rendering task such that some of the rendering task is performed remotely by another device and some of the rendering task is performed locally by the XR device. In some examples, the XR device may offload rendering tasks to a plurality of devices. For example, the XR device may offload rendering tasks to a plurality of UEs, to a UE and a network node, or to a plurality of network nodes, among other examples.

Some aspects described herein provide for view-based offloading of data for rendering to neighboring devices with under-utilized computing resources. "View," which may also be referred to as "viewport" or "viewpoint," may refer to XR data that is associated with a particular position, orientation, and/or configuration of an XR device. For example, "view" may refer to data that is to be presented via a display of an XR device when the XR device is positioned in a particular orientation (e.g., with a particular field of view). In some aspects, an XR device may provide view-dependent multiple streaming via offloading of XR rendering tasks. For example, an XR device may identify a division of data for offloaded rendering by a set of wireless communication devices (e.g., a set of UEs and/or network nodes). In some aspects, the XR device may divide the data such that some data is associated with an overprovisioned viewpoint and is processed by a UE and some data is associated with a provisioned viewpoint and is processed by a network node, as described in more detail herein.

Provisioned viewpoint rendering may be used for an XR application. A provisioned viewpoint rendering task may be performed at a node with sufficient computing or rendering resources (e.g., at an edge of a network). Provisioned viewpoint rendering tasks may be delivered to a node via a more reliable 5G wireless connection (e.g., to a network node via Uu interface). Alternatively, provisioned viewpoint rendering tasks may be performed at an XR device (e.g., for a latency sensitive XR application). A provisioned viewpoint may be determined or selected by an XR device dynamically based at least in part on pose information. For example, a provisioned viewpoint may be selected by an XR device based on the best pose information. Over-provisioned viewpoints may be provided for XR rendering to achieve higher resolution for better quality of experience (QoE). Over-provisioned viewpoint rendering tasks may be delivered to additional 5G nodes (e.g., one or more UEs) via direct wireless connections (e.g., WiFi or 5G sidelink on licensed or unlicensed spectrum). View-dependent multiple streaming may be delivered for XR rendering via offloading to a network node via Uu interface and/or one or more UEs via sidelink connections to achieve high resolution for improved XR immersive experience. In this way, the XR device can efficiently offload data to other wireless communications devices for rendering, thereby enabling the XR device to satisfy a QoS or QoE requirement associated with an XR service.

Figure 6A:
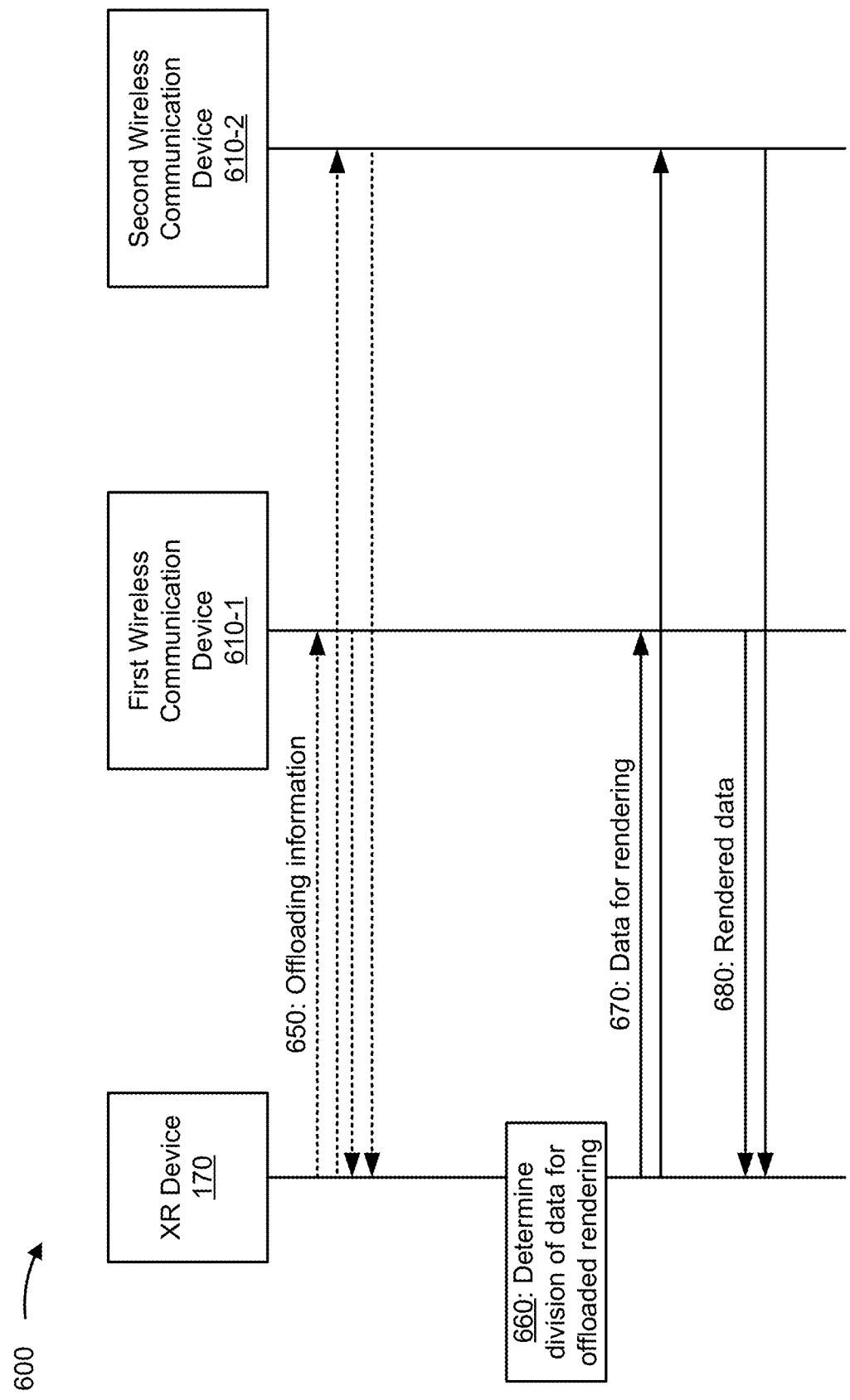
FIGS. 6A-6C are diagrams illustrating examples associated with view-dependent multiple streaming for XR rendering offloading, in accordance with the present disclosure.
Figure 6B:
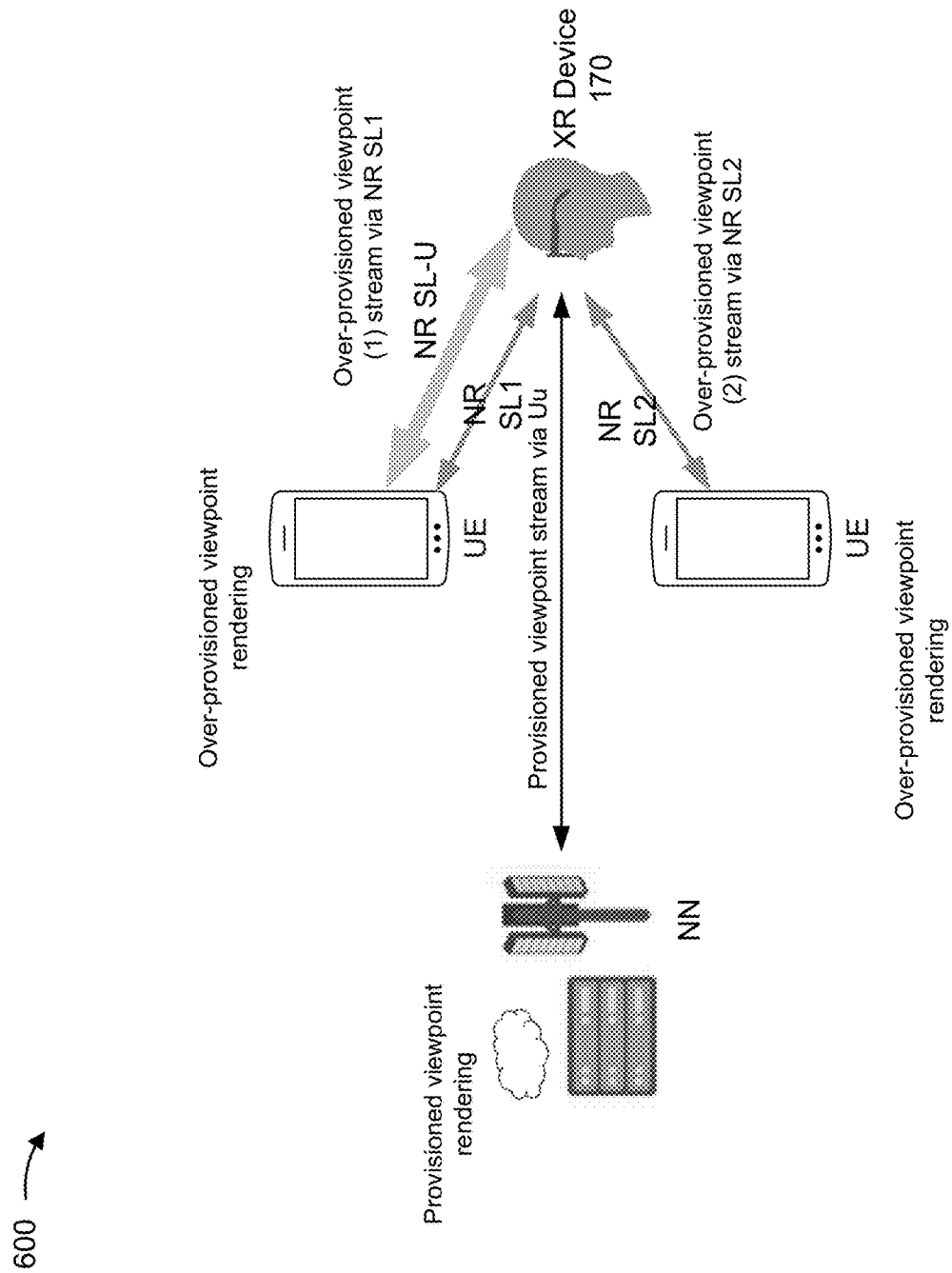
Figure 6C:
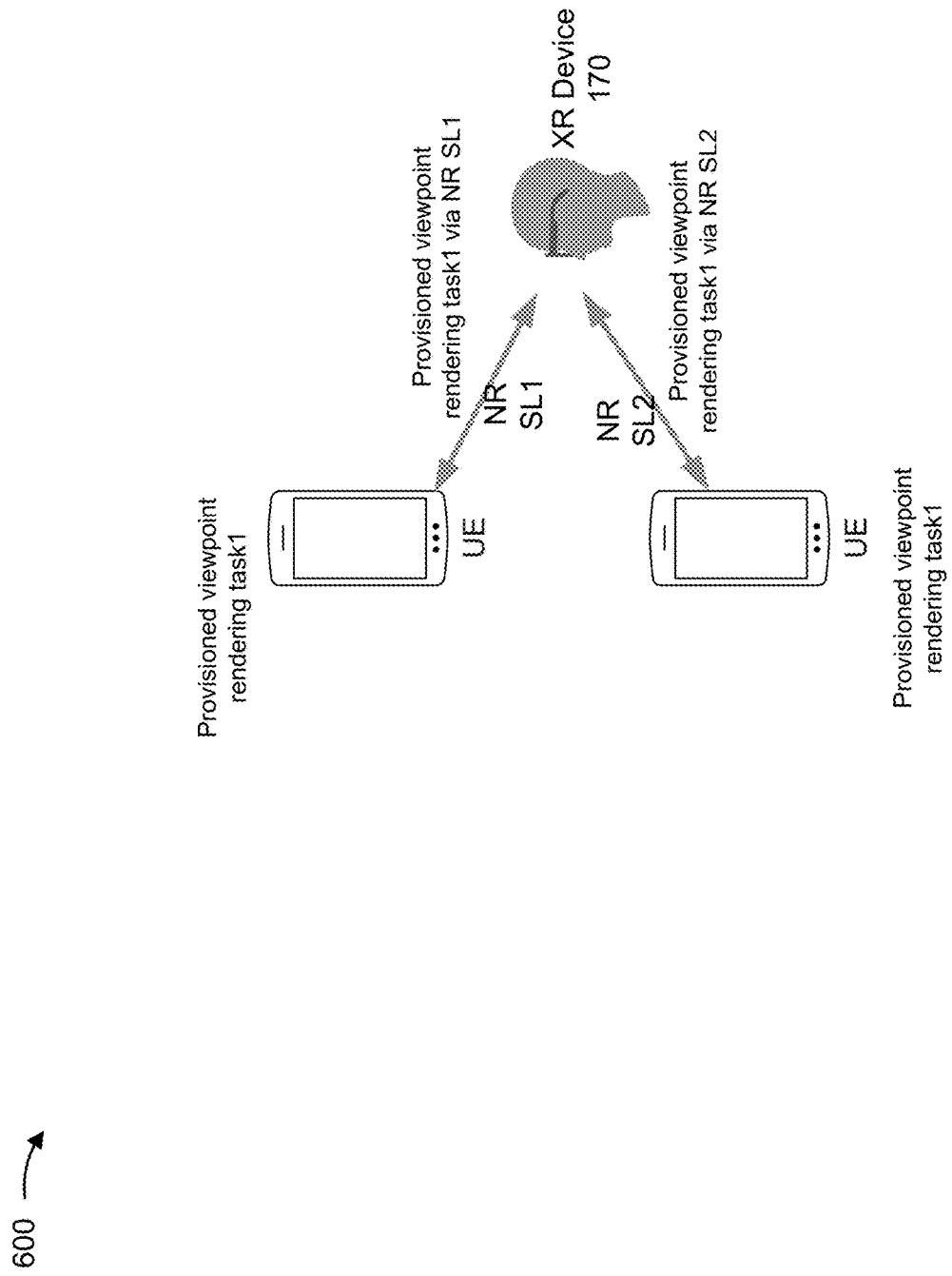

FIGS. 6A-6C are diagrams illustrating examples 600 associated with view-dependent multiple streaming for XR rendering offloading, in accordance with the present disclosure. As shown in FIG. 6A, example 600 includes communication between an XR device 170 and a set of wireless communication devices 610, which may be one or more UEs 120 or network nodes 110.

As further shown in FIG. 6A, and by reference number 650, in some aspects, the XR device 170 may receive offloading information. For example, the XR device 170 may receive information associated with identifying a division for offloading of data for rendering. In some aspects, the XR device 170 may receive the offloading information from first wireless communication device 610-1 or from second wireless communication device 610-2. For example, the XR device 170 may transmit a request for offloading information to the first wireless communication device 610-1 and may receive the offloading information as a response. The XR device 170 may transmit a request for offloading information to the first wireless communication device 610-2 and may receive the offloading information as a response. Additionally, or alternatively, the XR device 170 may receive offloading information from the first wireless communication device 610-1 and from the second wireless communication device 610-2.

In some aspects, the XR device 170 may receive a capability indicator with the offloading information. For example, a wireless communication device 610 may include, in the offloading information, information identifying a set of computing resources or power resources for the wireless communication device 610. In this way, the XR device 170 can identify whether to select the wireless communication device 610 for offloading based at least in part on an availability of computing resources at the wireless communication device 610. Additionally, or alternatively, the XR device 170 may receive connection information with the offloading information. For example, the wireless communication device 610 may provide information associated with identifying a reliability of a connection between the wireless communication device 610 and the XR device 170. In this case, the wireless communication device 610 may transmit a reference signal (e.g., for the XR device 170 to perform a measurement) or may transmit information identifying a measurement (e.g., of a reference signal transmitted by the XR device 170). In this way, the XR device may use the connection information to identify whether to offload data for rendering based at least in part on whether a connection to the wireless communication device 610 satisfies a threshold level of reliability.

As further shown in FIG. 6A, and by reference numbers 660 and 670, the XR device 170 may identify a division of data for offloaded rendering and may transmit the data for rendering. For example, the XR device 170 may identify the division of data between the first wireless communication device 610-1 and the second wireless communication device 610-2 and, in accordance with the division of data, may transmit a first portion of the data to the first wireless communication device 610-1 and a second portion of the data to the second wireless communication device 610-2.

In some aspects, the XR device 170 may identify the division of data based at least in part on computing resources. For example, as described above, based at least in part on a status of computing resources, a status of power resources, or a reliability of a connection of a set of wireless communication devices 610, the XR device 170 may identify a division of rendering tasks (e.g., a division of data for rendering) to efficiently utilize available resources of the set of wireless communication devices 610. In other words, the XR device 170 may provide more data to the first wireless communication device 610-1 than to the second wireless communication device 610-2 when the first wireless communication device 610-1 is associated with a greater availability of processing resources or a more reliable connection to the XR device 170 than the second wireless communication device 610-2.

In some aspects, the XR device 170 may identify pose information in connection with identifying the division of data for rendering. Pose information may include a position and orientation in space relative to an XR space, which describes a state of a viewer of the XR scene as tracked by the XR device 170, as described in more detail with regard to 3GPP TR 26.928. In this case, the XR device 170 may identify a viewpoint to provision based at least in part on the pose information and may offload provisioning tasks (e.g., rendering of data) for the viewpoint based at least in part on selecting the viewpoint. In some aspects, the XR device 170 may identify a viewpoint to over-provision. An over-provisioned viewpoint may be provided for XR offloaded rendering via a UE to achieve a higher resolution or a better QoE. In other words, the XR device 170 may provide a provisioning task to a network node wireless communication device 610 (e.g., via a Uu interface) and an over-provisioning task to a UE wireless communication device 610 (e.g., via a 5G or NR sidelink (SL) interface), as shown in FIG. 6B. For example, in FIG. 6B, the XR device 170 provides provisioned viewpoint rendering tasks to a network node (NN) and over-provisioned viewpoint rendering tasks to one or more UEs. In this case, a closer proximity of the UE wireless communication device 610 to the XR device 170 may result in reduced latency relative to the network node wireless communication device 610, which may result in the UE wireless communication device 610 being more suitable for over-provisioning. In other words, the XR device 170 may identify to provide data for rendering for over-provisioned viewpoints to a first one or more wireless communication devices 610 (e.g., one or more UEs 120 via Wi-Fi, 5G/NR SL, or 5G/NR sidelink unlicensed spectrum (SL-U)) and data for rendering for provisioned viewpoints to a second one or more wireless communication devices 610 (e.g., a network node 110 via a Uu interface). In this way, the XR device 170 may perform viewpoint-dependent or viewport-dependent multiple streaming for XR rendering.

In some aspects, the XR device 170 may assign a rendering task to a wireless communication device 610 for offloading based at least in part on a characteristic of the task. For example, for a task $T_i$, the XR device 170 may identify a computational usage $C_i$, a communication bandwidth usage and/or an end-to-end latency parameter $L_i$. As an example, for a best effort task, the XR device 170 may identify the task to have parameters $C_i=C_{min}$, $=B_{min}$, and $L_i=L_{max}$ (where "min" represents a smallest or best achievable value). In other words, a task may be represented by a function $T_i=\{C_i, B_i, L_i\}$. In this case, a provisioned viewpoint task $T_1=\{C_1, B_1, L_1\}$ and an over-provisioned task $T_2=\{C_{min}, B_{min}, L_{max}\}$ (e.g., over-provisioned tasks are best-effort tasks). Accordingly, the XR device 170 may identify a set of available resources for $T_1$ and $T_2$ and assign $T_1$ and $T_2$ to, for example, different wireless communication devices 610 to achieve differentiated service for provisioned viewports and over-provisioned viewports.

In a first example of viewport-dependent multiple streaming, a network node wireless communication device 610 indicates sufficient computing resources to guarantee provisioned viewpoint rendering (e.g., a Uu connection to the network node wireless communication device 610 has a larger bandwidth and a more reliable connection than an NR SL connection to a UE wireless communication device 610). Such an example may occur with a latency tolerant XR application or when XR device 170 is at a network in-coverage area. In this case, the XR device 170 may operate on a 5G SL concurrently with an NR Uu on inter-band or intra-band co-current V2X operating bands. As a result, the XR device 170 may have provisioned viewpoint rendering via the network node wireless communication device 610 (e.g., the Uu connection) and over-provisioned viewpoint rendering via the UE wireless communication device 610 (e.g., the NR SL connection).

In a second example, the UE wireless communication device 610 indicates a more reliable connection on an NR SL than on an NR SL-U (e.g., as the NR SL-U may not always be available due to listen-before-talk (LBT) or another contention-based access (CBA) technique). As a result, the XR device 170 may have provisioned viewpoint rendering via the NR SL for greater reliability and over-provisioned viewpoint rendering via the NR SL-U for greater capacity (when available). In a third example, the XR device 170 identifies that an NR SL or LTE SL connection on FR1 is more reliable than an NR SL connection on FR2. As a result, when the XR device 170 supports inter-band multi-carrier operation, the XR device 170 may have provisioned viewpoint rendering to occur via the NR SL or LTE SL connection on FR1 for greater reliability and over-provisioned viewpoint rendering to occur via the NR SL connection on FR2 for greater capacity. In a fourth example, the XR device 170 may have capacity for some rendering to occur at XR device 170. In this case, the XR device 170 may have provisioned viewpoint rendering to occur at XR device 170 for lower latency and over-provisioned viewpoint rendering to occur at one or more wireless communication devices 610 (e.g., via at least one of Uu, NR SL LTE SL, NR SL-U connections) for greater capacity.

In some aspects, the XR device 170 may multiplex and/or coordinate communications for the wireless communication devices 610. For example, the XR device 170 may use spatial division multiplexing (SDM), frequency division multiplexing (FDM), or time division multiplexing (TDM) for multiplexing a plurality of rendering tasks onto a common set of spatial, frequency, or time resources (e.g., to a plurality of wireless communication devices 610 or to a single wireless communication device 610 via a plurality of connections). Additionally, or alternatively, the XR device 170 may use a plurality of multiplexing techniques, such as using both SDM and FDM for sidelink multiplexing of rendering data for a plurality of rendering tasks.

In some aspects, the XR device 170 may communicate one or more coordination messages to indicate coordination for offloading the rendering data. For example, the XR device 170 may configure (e.g., using a PC5 radio resource control (RRC) message) or activate (e.g., using a PC5 medium access control (MAC) control element (CE) activation message) a set of sidelinks. In this case, the XR device 170 may configure or activate a first sidelink (e.g., with first wireless communication device 610-1) with a first configuration and a second sidelink (e.g., with second wireless communication device 610-2) with a second configuration. In some aspects, the first configuration and the second configuration may differ with respect to beams used for SDM, frequency resources used for FDM (e.g., SL sub-channels, resource blocks (RBs), RB sets, or LBT sub-channels for SL-U), and/or time resources used for TDM (e.g., slots, mini-slots, aggregated slots, subframes, or frames). As an example, the XR device 170 may allocate a first protocol data unit (PDU) set on a first sidelink (SL1) for the first wireless communication device 610-1 and may allocate a second PDU set on a second sidelink (SL2) for the second wireless communication device 610-2. In this case, the XR device 170 may transmit control signaling to indicate the allocations, such as via sidelink control information (SCI), RRC signaling, or a MAC CE (e.g., using an inter-UE coordination (IUC) message to indicate configurations of SL1 and SL2). As another example, the XR device 170 may allocate traffic with a first QoS flow on the first sidelink to first wireless communication device 610-1 and traffic with a second QoS flow on a second sidelink to second wireless communication device 610-2. In this case, the XR device 170 may perform sidelink coordination for the wireless communication devices 610 for rendering offloading to multiple external devices via multiple sidelinks. In another case, a network node 110 or a UE 120 may serve as a coordination device and configure one or more link configurations for the XR device 170 to use for dividing data for rendering offloading.

In some aspects, XR device 170 may divide data for rendering to improve reliability. For example, the XR device 170 may jointly offload the same XR application rendering task to a plurality of wireless communication devices 610 in a spatial division multiplexing (SDM) manner. For example, XR device 170 may joint offload the same XR application rendering to more than one neighbouring UEs in SDM manner via beam-based NR SL1 and NR SL2 on FR2 licensed spectrum. In other words, the XR device 170 may offload the same rendering data (e.g., for a provisioned viewpoint) to the first wireless communication device 610-1 via a first sidelink and to the second wireless communication device 610-2 via a second sidelink. In this way, the XR device 170 uses offloading to provide redundancy for the provisioned viewpoint, which improves a reliability of the XR application. In some aspects, the XR device 170 may divide data for rendering to improve spectrum efficiency. For example, the XR device 170 may offload different XR application rendering tasks to a plurality of wireless communication devices 610 (e.g., using SDM, FDM, and/or TDM). In other words, the XR device 170 may offload first rendering data (e.g., for a first provisioned viewpoint) to the first wireless communication device 610-1 via a first sidelink and second rendering data (e.g., for a second, different provisioned viewpoint) to the second wireless communication device 610-2 via a second sidelink, which ensures that spectrum resources are being efficiently used to maximize a quantity of rendering tasks that can be completed. FIG. 6C shows examples of offloading provisioned viewpoint rendering tasks to a set of UEs. In one example, the XR device 170 offloads the same rendering task to both UEs in FIG. 6C to improve reliability. In another example, the XR device 170 offloads different rendering tasks to each UE in FIG. 6C to improve spectrum efficiency.

As further shown in FIG. 6A, and by reference number 680, the XR device 170 may receive rendered data. For example, the XR device 170 may receive rendered data from the first wireless communication device 610-1 based at least in part on transmitting data for rendering to the first wireless communication device 610-1. Additionally, or alternatively, the XR device 170 may receive rendered data from the second wireless communication device 610-2 based at least in part on transmitting data for rendering to the second wireless communication device 610-2. Additionally, or alternatively, the XR device 170 may receive rendered data from a plurality of devices, such as from both the first and the second wireless communication devices 610. Based at least in part on receiving the rendered data, the XR device 170 may output the rendered data. For example, the XR device 170 may output the rendered data as video via a display. In some aspects, the XR device 170 may combine the rendered data (e.g., that was offloaded to one or more other devices) with additional rendered data (e.g., that was rendered by the XR device 170). In this way, the XR device 170 expands a capacity of the XR device 170 for rendering of data (e.g., for XR services) by using offloading to other devices to supplement or supplant rendering performed at the XR device 170.

As indicated above, FIGS. 6A-6C are provided as examples. Other examples may differ from what is described with respect to FIGS. 6A-6C.

Figure 7:
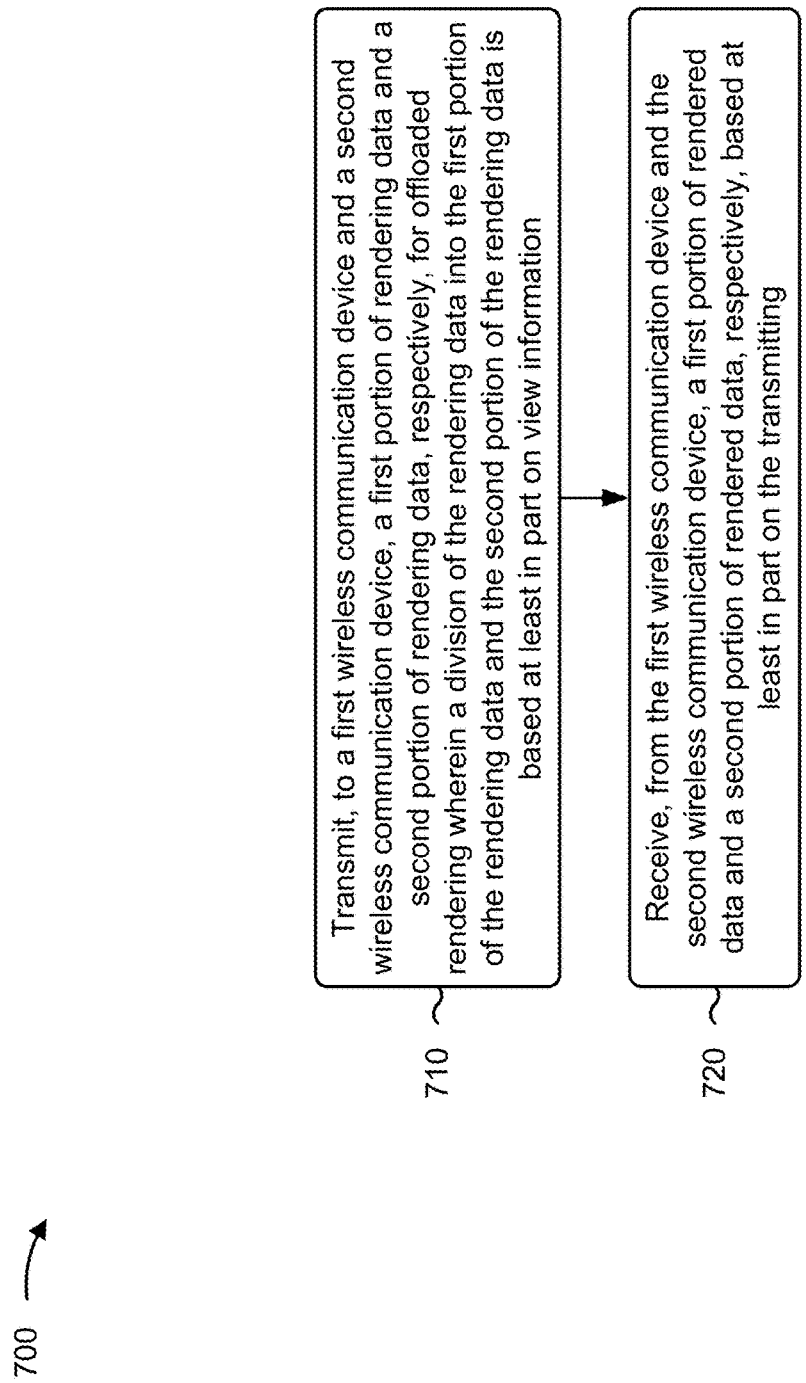
FIG. 7 is a diagram illustrating an example process performed, for example, by an XR device, in accordance with the present disclosure.

FIG. 7 is a diagram illustrating an example process 700 performed, for example, by an XR device, in accordance with the present disclosure. Example process 700 is an example where the XR device (e.g., XR device 170) performs operations associated with view-dependent multiple streaming for XR rendering offloading.

As shown in FIG. 7, in some aspects, process 700 may include transmitting, to a first wireless communication device and a second wireless communication device, a first portion of rendering data and a second portion of rendering data, respectively, for offloaded rendering, wherein a division of the rendering data into the first portion of the rendering data and the second portion of the rendering data is based at least in part on view information (block 710). For example, the XR device (e.g., using communication manager 172 and/or transmission component 904, depicted in FIG. 9) may transmit, to a first wireless communication device and a second wireless communication device, a first portion of rendering data and a second portion of rendering data, respectively, for offloaded rendering, as described above. In some aspects, a division of the rendering data into the first portion of the rendering data and the second portion of the rendering data is based at least in part on view information.

As further shown in FIG. 7, in some aspects, process 700 may include receiving, from the first wireless communication device and the second wireless communication device, a first portion of rendered data and a second portion of the rendered data, respectively, based at least in part on the transmitting (block 720). For example, the XR device (e.g., using communication manager 172 and/or reception component 902, depicted in FIG. 9) may receive, from the first wireless communication device and the second wireless communication device, a first portion of rendered data and a second portion of the rendered data, respectively, based at least in part on the transmitting, as described above.

Process 700 may include additional aspects, such as any single aspect or any combination of aspects described below and/or in connection with one or more other processes described elsewhere herein.

In a first aspect, process 700 includes identifying the division of the rendering data based at least in part on computing resources of at least one of the first wireless communication device or the second wireless communication device.

In a second aspect, alone or in combination with the first aspect, process 700 includes identifying the division of the rendering data based at least in part on pose information associated with the view information.

In a third aspect, alone or in combination with one or more of the first and second aspects, the view information includes a first view that is rendered with a first resolution and a second view that is rendered with a second resolution that is higher than the first resolution.

In a fourth aspect, alone or in combination with one or more of the first through third aspects, process 700 includes identifying the division of the rendering data based at least in part on at least one of a rendering capability or a connection type, of the first wireless communication device or the second wireless communication device, for achieving the first resolution or the second resolution.

In a fifth aspect, alone or in combination with one or more of the first through fourth aspects, process 700 includes identifying the division of the rendering data based at least in part on at least one of a computational level for a task, a bandwidth level for communicating data associated with the task, or a latency associated with the task.

In a sixth aspect, alone or in combination with one or more of the first through fifth aspects, process 700 includes selecting a connection type for a set of tasks, including the task, to satisfy a set of criteria associated with the set of tasks.

In a seventh aspect, alone or in combination with one or more of the first through sixth aspects, the connection type includes at least one of a sidelink connection type, a Uu interface connection type, an inter-band connection type, an intra-band connection type, a V2X band connection type, a licensed spectrum connection type, an unlicensed spectrum connection type, an FR1 connection type, an FR2 connection type, a 4G/LTE connection type, a 5G/NR connection type, or a 6G+ connection type.

In an eighth aspect, alone or in combination with one or more of the first through seventh aspects, first communications between the device and the first wireless communication device and second communications between the device and the second wireless communication device, associated with conveying data for offloaded rendering, are multiplexed using at least one of spatial division multiplexing, time division multiplexing, or frequency division multiplexing.

In a ninth aspect, alone or in combination with one or more of the first through eighth aspects, process 700 includes configuring at least one resource for communication of data associated with offloaded rendering.

In a tenth aspect, alone or in combination with one or more of the first through ninth aspects, the at least one resource is at least one of a frequency resource, a spatial resource, or a time resource.

In an eleventh aspect, alone or in combination with one or more of the first through tenth aspects, the resource is configured via at least one of a radio resource control configuration message or a MAC CE activation message.

In a twelfth aspect, alone or in combination with one or more of the first through eleventh aspects, configuring the at least one resource comprises transmitting an inter-UE coordination information message to configure the at least one resource.

In a thirteenth aspect, alone or in combination with one or more of the first through twelfth aspects, process 700 includes identifying the division of the rendering data based at least in part on a reliability criterion or a spectrum efficiency criterion.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
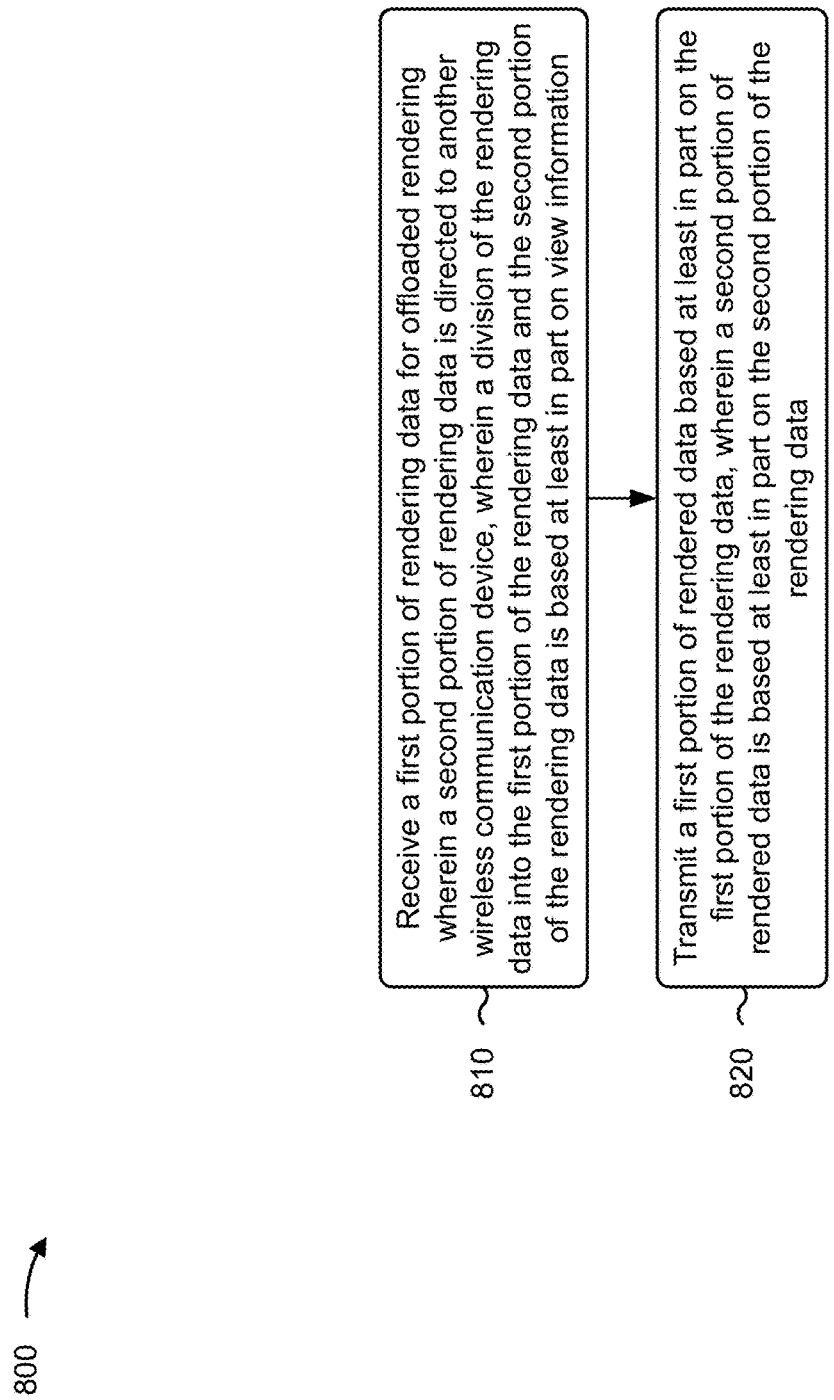
FIG. 8 is a diagram illustrating an example process performed, for example, by a wireless communication device, in accordance with the present disclosure.

FIG. 8 is a diagram illustrating an example process 800 performed, for example, by a wireless communication device, in accordance with the present disclosure. Example process 800 is an example where the wireless communication device (e.g., a wireless communication device 610, a UE 120, or a network node 110) performs operations associated with view-dependent multiple streaming for XR rendering offloading.

As shown in FIG. 8, in some aspects, process 800 may include receiving a first portion of rendering data for offloaded rendering, wherein a second portion of rendering data is directed to another wireless communication device, wherein a division of the rendering data into the first portion of the rendering data and the second portion of the rendering data is based at least in part on view information (block 810). For example, the wireless communication device (e.g., using communication manager 140/150 and/or reception component 1002, depicted in FIG. 10) may receive a first portion of rendering data for offloaded rendering, wherein a second portion of rendering data is directed to another wireless communication device, as described above. In some aspects, the second portion of the rendering data is directed to another wireless communication device, wherein a division of the rendering data into the first portion of the rendering data and the second portion of the rendering data is based at least in part on view information.

As further shown in FIG. 8, in some aspects, process 800 may include transmitting a first portion of rendered data based at least in part on the first portion of the rendering data, wherein a second portion of the rendered data is based at least in part on the second portion of the rendering data (block 820). For example, the wireless communication device (e.g., using communication manager 140/150 and/or transmission component 1004, depicted in FIG. 10) may transmit a first portion of rendered data based at least in part on the first portion of the rendering data, wherein a second portion of the rendered data is based at least in part on the second portion of the rendering data, as described above.

Process 800 may include additional aspects, such as any single aspect or any combination of aspects described below and/or in connection with one or more other processes described elsewhere herein.

In a first aspect, process 800 includes rendering the first portion of the rendering data to generate the first portion of the rendered data.

In a second aspect, alone or in combination with the first aspect, the division of the rendering data is based at least in part on computing resources of the first wireless communication device.

In a third aspect, alone or in combination with one or more of the first and second aspects, the division of the rendering data is based at least in part on pose information associated with the view information.

In a fourth aspect, alone or in combination with one or more of the first through third aspects, the view information includes a first view that is rendered with a first resolution and a second view that is rendered with a second resolution that is higher than the first resolution.

In a fifth aspect, alone or in combination with one or more of the first through fourth aspects, the division of the rendering data is based at least in part on at least one of a rendering capability or a connection type.

In a sixth aspect, alone or in combination with one or more of the first through fifth aspects, the division of the rendering data is based at least in part on at least one of a computational level for a task, a bandwidth level for communicating data associated with the task, or a latency associated with the task.

In a seventh aspect, alone or in combination with one or more of the first through sixth aspects, a connection type for a set of tasks, including the task, satisfies a set of criteria associated with the set of tasks.

In an eighth aspect, alone or in combination with one or more of the first through seventh aspects, the connection type includes at least one of a sidelink connection type, a Uu interface connection type, an inter-band connection type, an intra-band connection type, a V2X band connection type, a licensed spectrum connection type, an unlicensed spectrum connection type, an FR1 connection type, an FR2 connection type, a 4G/LTE connection type, a 5G/NR connection type, or a 6G+ connection type.

In a ninth aspect, alone or in combination with one or more of the first through eighth aspects, communications conveying data for offloaded rendering are multiplexed using at least one of spatial division multiplexing, time division multiplexing, or frequency division multiplexing.

In a tenth aspect, alone or in combination with one or more of the first through ninth aspects, process 800 includes configuring at least one resource for communication of data associated with offloaded rendering.

In an eleventh aspect, alone or in combination with one or more of the first through tenth aspects, the at least one resource is at least one of a frequency resource, a spatial resource, or a time resource.

In a twelfth aspect, alone or in combination with one or more of the first through eleventh aspects, the resource is configured via at least one of a radio resource control configuration message or a MAC CE activation message.

In a thirteenth aspect, alone or in combination with one or more of the first through twelfth aspects, configuring the at least one resource comprises receiving a coordination information message to configure the at least one resource.

In a fourteenth aspect, alone or in combination with one or more of the first through thirteenth aspects, the division of the rendering data is based at least in part on a reliability criterion or a spectrum efficiency criterion.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
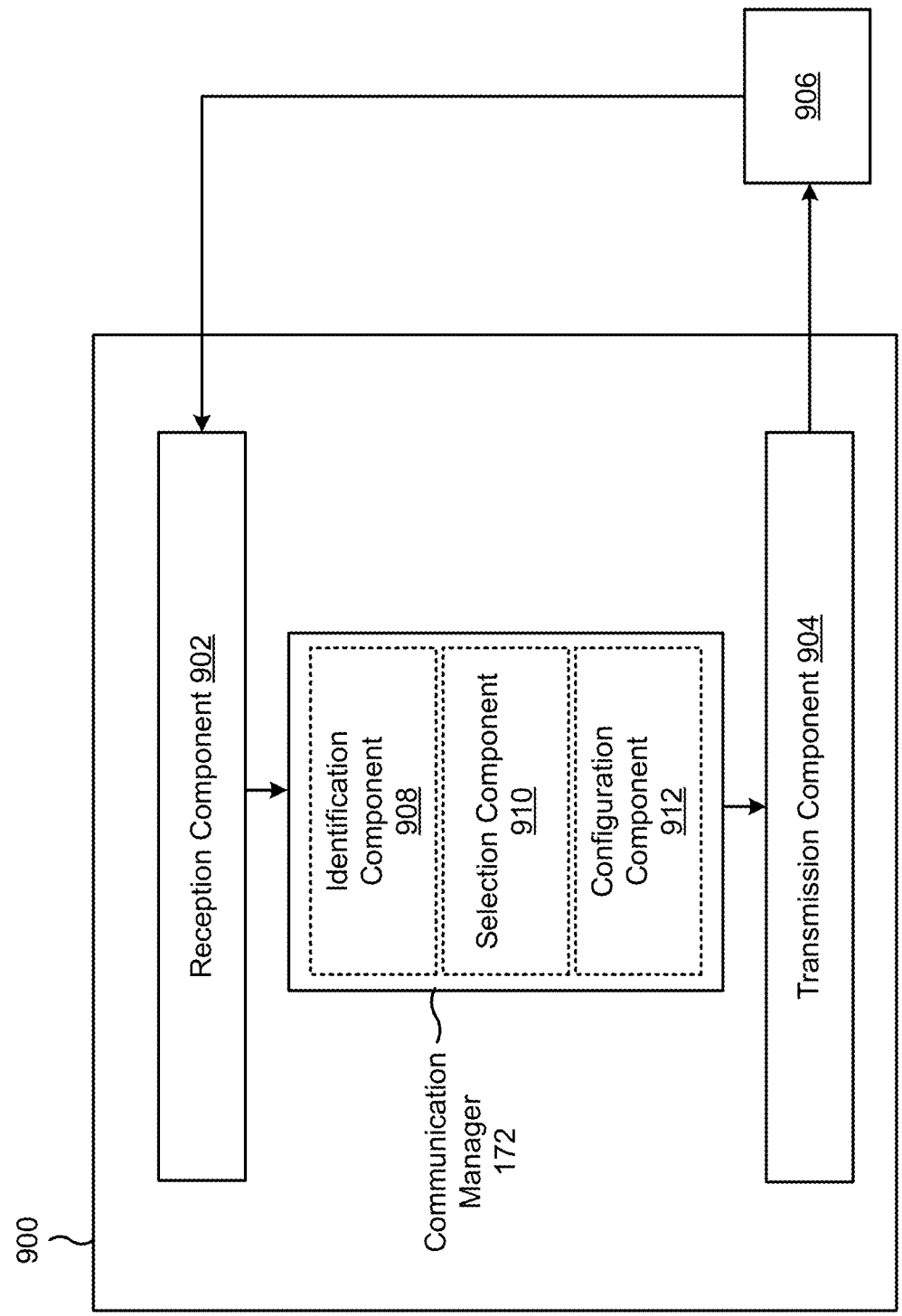
FIGS. 9-10 are diagrams of example apparatuses for wireless communication, in accordance with the present disclosure.

FIG. 9 is a diagram of an example apparatus 900 for wireless communication, in accordance with the present disclosure. The apparatus 900 may be a XR device, or a XR device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 172. The communication manager 172 may include one or more of an identification component 908, a selection component 910, or a configuration component 912, among other examples.

In some aspects, the apparatus 900 may be configured to perform one or more operations described herein in connection with FIGS. 6A-6C. Additionally, or alternatively, the apparatus 900 may be configured to perform one or more processes described herein, such as process 700 of FIG. 7. In some aspects, the apparatus 900 and/or one or more components shown in FIG. 9 may include one or more components of the XR device described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the XR device described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the XR device described in connection with FIG. 2. In some aspects, the transmission component 904 may be co-located with the reception component 902 in a transceiver.

The transmission component 904 may transmit, to a first wireless communication device and a second wireless communication device, a first portion of rendering data and a second portion of rendering data, respectively, for offloaded rendering, wherein a division of the rendering data into the first portion of the rendering data and the second portion of the rendering data is based at least in part on view information. The reception component 902 may receive, from the first wireless communication device and the second wireless communication device, a first portion of rendered data and a second portion of the rendered data, respectively, based at least in part on the transmitting.

The identification component 908 may identify the division of the rendering data based at least in part on computing resources of at least one of the first wireless communication device or the second wireless communication device. The identification component 908 may identify the division of the rendering data based at least in part on pose information associated with the view information. The identification component 908 may identify the division of the rendering data based at least in part on at least one of a rendering capability or a connection type, of the first wireless communication device or the second wireless communication device, for achieving the first resolution or the second resolution.

The identification component 908 may identify the division of the rendering data based at least in part on at least one of a computational level for a task, a bandwidth level for communicating data associated with the task, or a latency associated with the task. The selection component 910 may select a connection type for a set of tasks, including the task, to satisfy a set of criteria associated with the set of tasks. The configuration component 912 may configure at least one resource for communication of data associated with offloaded rendering. The identification component 908 may identify the division of the rendering data based at least in part on a reliability criterion or a spectrum efficiency criterion.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
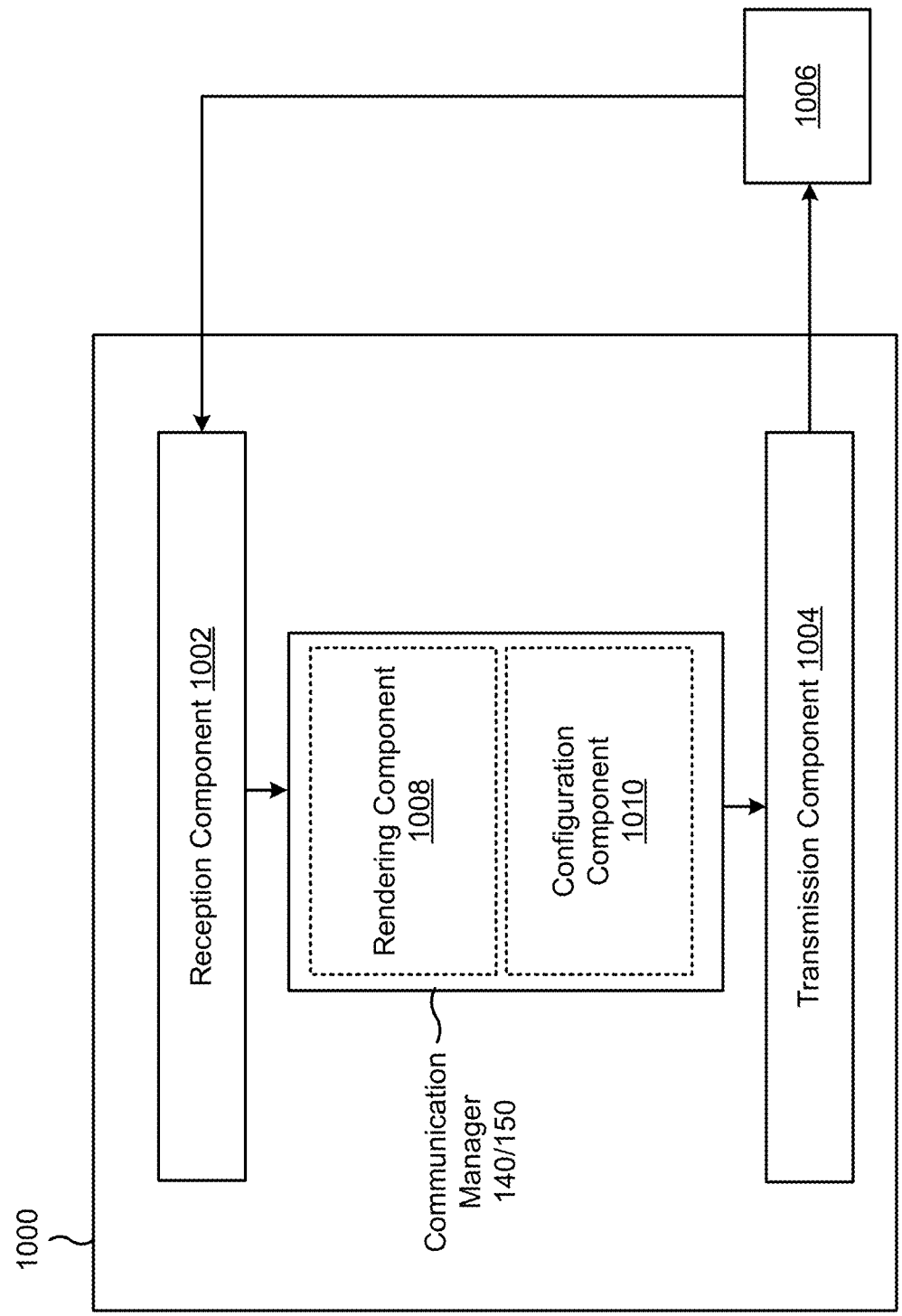

FIG. 10 is a diagram of an example apparatus 1000 for wireless communication, in accordance with the present disclosure. The apparatus 1000 may be a wireless communication device (e.g., a UE 120 or a network node 110), or a wireless communication device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140/150. The communication manager 140/150 may include one or more of a rendering component 1008 or a configuration component 1010, among other examples.

In some aspects, the apparatus 1000 may be configured to perform one or more operations described herein in connection with FIGS. 6A-6C. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the wireless communication device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the wireless communication device described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the wireless communication device described in connection with FIG. 2. In some aspects, the transmission component 1004 may be co-located with the reception component 1002 in a transceiver.

The reception component 1002 may receive a first portion of rendering data for offloaded rendering, wherein a second portion of rendering data is directed to another wireless communication device, wherein a division of the rendering data into the first portion of the rendering data and the second portion of the rendering data is based at least in part on view information. The transmission component 1004 may transmit a first portion of rendered data based at least in part on the first portion of the rendering data, wherein a second portion of the rendered data is based at least in part on the second portion of the rendering data. The rendering component 1008 may render the first portion of the rendering data to generate the first portion of the rendered data. The configuration component 1010 may configure at least one resource for communication of data associated with offloaded rendering.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by an apparatus of an extended reality (XR) device, comprising: transmitting, to a first wireless communication device and a second wireless communication device, a first portion of rendering data and a second portion of rendering data, respectively, for offloaded rendering, wherein a division of the rendering data into the first portion of the rendering data and the second portion of the rendering data is based at least in part on view information; and receiving, from the first wireless communication device and the second wireless communication device, a first portion of rendered data and a second portion of the rendered data, respectively, based at least in part on the transmitting.

Aspect 2: The method of Aspect 1, further comprising: identifying the division of the rendering data based at least in part on computing resources of at least one of the first wireless communication device or the second wireless communication device.

Aspect 3: The method of any of Aspects 1 to 2, further comprising: identifying the division of the rendering data based at least in part on pose information associated with the view information.

Aspect 4: The method of any of Aspects 1 to 3, wherein the view information includes a first view that is rendered with a first resolution and a second view that is rendered with a second resolution that is higher than the first resolution.

Aspect 5: The method of Aspect 4, further comprising: identifying the division of the rendering data based at least in part on at least one of a rendering capability or a connection type, of the first wireless communication device or the second wireless communication device, for achieving the first resolution or the second resolution.

Aspect 6: The method of any of Aspects 1 to 5, further comprising: identifying the division of the rendering data based at least in part on at least one of: a computational level for a task, a bandwidth level for communicating data associated with the task, or a latency associated with the task.

Aspect 7: The method of Aspect 6, further comprising: selecting a connection type for a set of tasks, including the task, to satisfy a set of criteria associated with the set of tasks.

Aspect 8: The method of Aspect 7, wherein the connection type includes at least one of: a sidelink connection type, a Uu interface connection type, an inter-band connection type, an intra-band connection type, a Vehicle-to-everything (V2X) band connection type, a licensed spectrum connection type, an unlicensed spectrum connection type, a frequency range 1 (FR1) connection type, a frequency range 2 (FR2) connection type, a 4G/Long Term Evolution (LTE) connection type, a 5G/New Radio (5G/NR) connection type, or a higher generation (6G+) connection type.

Aspect 9: The method of any of Aspects 1 to 8, wherein first communications between the XR device and the first wireless communication device and second communications between the XR device and the second wireless communication device, associated with conveying data for offloaded rendering, are multiplexed using at least one of: spatial division multiplexing, time division multiplexing, or frequency division multiplexing.

Aspect 10: The method of any of Aspects 1 to 9, further comprising: configuring at least one resource for communication of data associated with offloaded rendering.

Aspect 11: The method of Aspect 10, wherein the at least one resource is at least one of a frequency resource, a spatial resource, or a time resource.

Aspect 12: The method of Aspect 10, wherein the resource is configured via at least one of a radio resource control configuration message or a medium access control (MAC) control element activation message.

Aspect 13: The method of Aspect 10, wherein configuring the at least one resource comprises: transmitting an inter-user equipment coordination information message to configure the at least one resource.

Aspect 14: The method of any of Aspects 1 to 13, further comprising: identifying the division of the rendering data based at least in part on a reliability criterion or a spectrum efficiency criterion.

Aspect 15: A method of wireless communication performed by a wireless communication device, comprising: receiving a first portion of rendering data for offloaded rendering, wherein a second portion of rendering data is directed to another wireless communication device, wherein a division of the rendering data into the first portion of the rendering data and the second portion of the rendering data is based at least in part on view information; and transmitting a first portion of rendered data based at least in part on the first portion of the rendering data, wherein a second portion of the rendered data is based at least in part on the second portion of the rendering data.

Aspect 16: The method of Aspect 15, further comprising: rendering the first portion of the rendering data to generate the first portion of the rendered data.

Aspect 17: The method of any of Aspects 15 to 16, wherein the division of the rendering data is based at least in part on computing resources of the first wireless communication device.

Aspect 18: The method of any of Aspects 15 to 17, wherein the division of the rendering data is based at least in part on pose information associated with the view information.

Aspect 19: The method of any of Aspects 15 to 18, wherein the view information includes a first view that is rendered with a first resolution and a second view that is rendered with a second resolution that is higher than the first resolution.

Aspect 20: The method of Aspect 19, wherein the division of the rendering data is based at least in part on at least one of a rendering capability or a connection type.

Aspect 21: The method of any of Aspects 15 to 20, wherein the division of the rendering data is based at least in part on at least one of: a computational level for a task, a bandwidth level for communicating data associated with the task, or a latency associated with the task.

Aspect 22: The method of Aspect 21, wherein a connection type for a set of tasks, including the task, satisfies a set of criteria associated with the set of tasks.

Aspect 23: The method of Aspect 22, wherein the connection type includes at least one of: a sidelink connection type, a Uu interface connection type, an inter-band connection type, an intra-band connection type, a Vehicle-to-everything (V2X) band connection type, a licensed spectrum connection type, an unlicensed spectrum connection type, a frequency range 1 (FR1) connection type, a frequency range 2 (FR2) connection type, a 4G/Long Term Evolution (LTE) connection type, a 5G/New Radio (5G/NR) connection type, or a higher generation (6G+) connection type.

Aspect 24: The method of any of Aspects 15 to 23, wherein communications conveying data for offloaded rendering are multiplexed using at least one of: spatial division multiplexing, time division multiplexing, or frequency division multiplexing.

Aspect 25: The method of any of Aspects 15 to 24, further comprising: configuring at least one resource for communication of data associated with offloaded rendering.

Aspect 26: The method of Aspect 25, wherein the at least one resource is at least one of a frequency resource, a spatial resource, or a time resource.

Aspect 27: The method of Aspect 25, wherein the resource is configured via at least one of a radio resource control configuration message or a medium access control (MAC) control element activation message.

Aspect 28: The method of Aspect 25, wherein configuring the at least one resource comprises: receiving a coordination information message to configure the at least one resource.

Aspect 29: The method of any of Aspects 15 to 28, wherein the division of the rendering data is based at least in part on a reliability criterion or a spectrum efficiency criterion.

Aspect 30: An apparatus for wireless communication at a device, comprising a processor; memory coupled with the processor; and instructions stored in the memory and executable by the processor to cause the apparatus to perform the method of one or more of Aspects 1-14.

Aspect 31: A device for wireless communication, comprising a memory and one or more processors coupled to the memory, the one or more processors configured to perform the method of one or more of Aspects 1-14.

Aspect 32: An apparatus for wireless communication, comprising at least one means for performing the method of one or more of Aspects 1-14.

Aspect 33: A non-transitory computer-readable medium storing code for wireless communication, the code comprising instructions executable by a processor to perform the method of one or more of Aspects 1-14.

Aspect 34: A non-transitory computer-readable medium storing a set of instructions for wireless communication, the set of instructions comprising one or more instructions that, when executed by one or more processors of a device, cause the device to perform the method of one or more of Aspects 1-14.

Aspect 35: An apparatus for wireless communication at a device, comprising a processor; memory coupled with the processor; and instructions stored in the memory and executable by the processor to cause the apparatus to perform the method of one or more of Aspects 15-29.

Aspect 36: A device for wireless communication, comprising a memory and one or more processors coupled to the memory, the one or more processors configured to perform the method of one or more of Aspects 15-29.

Aspect 37: An apparatus for wireless communication, comprising at least one means for performing the method of one or more of Aspects 15-29.

Aspect 38: A non-transitory computer-readable medium storing code for wireless communication, the code comprising instructions executable by a processor to perform the method of one or more of Aspects 15-29.

Aspect 39: A non-transitory computer-readable medium storing a set of instructions for wireless communication, the set of instructions comprising one or more instructions that, when executed by one or more processors of a device, cause the device to perform the method of one or more of Aspects 15-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An extended reality (XR) device for wireless communication, comprising:
one or more memories; and
one or more processors, coupled to the one or more memories, configured to:
identify a division of rendering data, among a first wireless communication device and a second wireless communication device, for offloaded rendering;
transmit signaling indicating:
an allocation of a first protocol data unit (PDU) set on a first sidelink for the first wireless communication device, and
an allocation of a second PDU set on a second sidelink for the second wireless communication device;
transmit, based at least in part on the division of rendering data, the first PDU set, and the second PDU set, a first portion of rendering data to the first wireless communication device and a second portion of rendering data to the second wireless communication device; and
receive, based at least in part on transmitting the first portion of rendering data and the second portion of rendering data, a first portion of rendered data from the first wireless communication device and a second portion of rendered data from the second wireless communication device.

2. The XR device of claim 1, wherein the division of rendering data among the first wireless communication device and the second wireless communication device is further identified based at least in part on computing resources of at least one of the first wireless communication device or the second wireless communication device.

3. The XR device of claim 1, wherein a first viewpoint, associated with the first wireless communication device, is associated with a higher resolution, and wherein a second viewpoint, associated with the second wireless communication device, is associated with a second resolution that is lower than the higher resolution.

4. The XR device of claim 1, wherein the division of rendering data among the first wireless communication device and the second wireless communication device is further identified based at least in part on at least one of a rendering capability or a connection type of the first wireless communication device or the second wireless communication device.

5. The XR device of claim 1, wherein the division of rendering data among the first wireless communication device and the second wireless communication device is further identified based at least in part on at least one of:
a computational level for a task,
a bandwidth level for communicating data associated with the task, or
a latency associated with the task.

6. The XR device of claim 5, wherein the one or more processors are further configured to:
select a connection type for a set of tasks, including the task, to satisfy a set of criteria associated with the set of tasks.

7. The XR device of claim 6, wherein the connection type includes at least one of:
a sidelink connection type,
a Uu interface connection type,
an inter-band connection type,
an intra-band connection type,
a Vehicle-to-everything (V2X) band connection type,
a licensed spectrum connection type,
an unlicensed spectrum connection type,
a frequency range 1 (FR1) connection type,
a frequency range 2 (FR2) connection type,
a 4G/Long Term Evolution (LTE) connection type,
a 5G/New Radio (5G/NR) connection type, or
a higher generation (6G+) connection type.

8. The XR device of claim 1, wherein first communications between the XR device and the first wireless communication device and second communications between the XR device and the second wireless communication device, associated with conveying data for offloaded rendering, are multiplexed using at least one of:
spatial division multiplexing,
time division multiplexing, or
frequency division multiplexing.

9. The XR device of claim 1, wherein the one or more processors are further configured to:
configure at least one resource for communication of data associated with offloaded rendering.

10. The XR device of claim 9, wherein the at least one resource is at least one of a frequency resource, a spatial resource, or a time resource.

11. The XR device of claim 9, wherein the resource is configured via at least one of a PC5 radio resource control (RRC) message or a PC5 medium access control (MAC) control element.

12. The XR device of claim 9, wherein the one or more processors, to configure the at least one resource, are configured to:
transmit an inter-user equipment coordination information message to configure the at least one resource.

13. The XR device of claim 1, wherein the division of rendering data among the first wireless communication device and the second wireless communication device is further identified based at least in part on a reliability criterion or a spectrum efficiency criterion.

14. The XR device of claim 1, wherein the one or more processors are further configured to:
transmit a request for offloading information to at least one of the first wireless communication device or the second wireless communication device; and
receive, based at least in part on transmitting the request, the offloading information from the at least one of the first wireless communication device or the second wireless communication device,
wherein the division of rendering data is identified based at least in part on the offloading information.

15. The XR device of claim 1, wherein the first portion of rendering data is associated with an over-provisioned viewpoint, to receive a higher resolution than the XR device, and
wherein the first portion of rendering data is provided to a user equipment (UE) based at least in part on the over-provisioned viewpoint, the first wireless communication device being the UE.

16. A wireless communication device for wireless communication, comprising:
one or more memories; and
one or more processors, coupled to the one or more memories, configured to:
receive, from an extended reality (XR) device, signaling indicating an allocation of a protocol data unit (PDU) set on a sidelink for the wireless communication device;
receive, from the XR device and based at least in part on the PDU set, a first portion of rendering data for offloaded rendering,
wherein the first portion of rendering data is different from a second portion of rendering data, for offloaded rendering for the XR device, associated with another wireless communication device that has another allocation of another PDU set on another sidelink; and
transmit, to the XR device, a first portion of rendered data based at least in part on the first portion of rendering data,
wherein a second portion of rendered data for the XR device is based at least in part on the second portion of rendering data.

17. The wireless communication device of claim 16, wherein the one or more processors are further configured to:
render the first portion of rendering data to generate the first portion of rendered data.

18. The wireless communication device of claim 16, wherein a division of rendering data among the wireless communication device and the other wireless communication device is further based at least in part on computing resources of at least one of the wireless communication device or the other wireless communication device.

19. The wireless communication device of claim 16, wherein a division of rendering data among the wireless communication device and the other wireless communication device is further based at least in part on pose information.

20. The wireless communication device of claim 16, wherein a division of rendering data among the wireless communication device and the other wireless communication device is further based at least in part on at least one of a rendering capability or a connection type.

21. The wireless communication device of claim 16, wherein a division of rendering data among the wireless communication device and the other wireless communication device is further based at least in part on at least one of:
a computational level for a task,
a bandwidth level for communicating data associated with the task, or
a latency associated with the task.

22. The wireless communication device of claim 21, wherein a connection type for a set of tasks, including the task, satisfies a set of criteria associated with the set of tasks.

23. The wireless communication device of claim 22, wherein the connection type includes at least one of:
a sidelink connection type,
a Uu interface connection type,
an inter-band connection type,
an intra-band connection type,
a Vehicle-to-everything (V2X) band connection type,
a licensed spectrum connection type,
an unlicensed spectrum connection type,
a frequency range 1 (FR1) connection type,
a frequency range 2 (FR2) connection type,
a 4G/Long Term Evolution (LTE) connection type,
a 5G/New Radio (5G/NR) connection type, or
a higher generation (6G+) connection type.

24. The wireless communication device of claim 16, wherein communications conveying data for offloaded rendering are multiplexed using at least one of:
spatial division multiplexing,
time division multiplexing, or
frequency division multiplexing.

25. The wireless communication device of claim 16, wherein the one or more processors are further configured to:
configure at least one resource for communication of data associated with offloaded rendering.

26. The wireless communication device of claim 25, wherein the at least one resource is at least one of a frequency resource, a spatial resource, or a time resource.

27. A method of wireless communication performed by an apparatus of an extended reality (XR) device, comprising:
identifying a division of rendering data, among a first wireless communication device and a second wireless communication device, for offloaded rendering;
transmitting signaling indicating:
an allocation of a first protocol data unit (PDU) set on a first sidelink for the first wireless communication device, and
an allocation of a second PDU set on a second sidelink for the second wireless communication device;
transmitting, based at least in part on the division of rendering data, the first PDU set, and the second PDU set, a first portion of rendering data to the first wireless communication device and a second portion of rendering data to the second wireless communication device; and
receiving, based at least in part on transmitting the first portion of rendering data and the second portion of rendering data, a first portion of rendered data from the first wireless communication device and a second portion of rendered data from the second wireless communication device.

28. The method of claim 27, wherein the division of rendering data is further identified based at least in part on computing resources of at least one of the first wireless communication device or the second wireless communication device.

29. A method of wireless communication performed by a wireless communication device, comprising:
receiving, from an extended reality (XR) device, signaling indicating an allocation of a protocol data unit (PDU) set on a sidelink for the wireless communication device;
receiving, from the XR device and based at least in part on the PDU set, a first portion of rendering data for offloaded rendering,
wherein the first portion of rendering data is different from a second portion of rendering data, for offloaded rendering for the XR device, associated with another wireless communication device that has another allocation of another PDU set on another sidelink; and transmitting, to the XR device, a first portion of rendered data based at least in part on the first portion of rendering data, wherein a second portion of rendered data for the XR device is based at least in part on the second portion of rendering data.

30. The method of claim 29, further comprising:

rendering the first portion of rendering data to generate the first portion of rendered data.

* * * * *